(12) United States Patent
Isahaya et al.

(10) Patent No.: US 9,822,218 B2
(45) Date of Patent: Nov. 21, 2017

(54) PROCESS FOR PRODUCING A HIGH MOLECULAR-WEIGHT AROMATIC POLYCARBONATE RESIN

(71) Applicant: MITSUBISHI GAS CHEMICAL COMPANY, INC., Tokyo (JP)

(72) Inventors: Yoshinori Isahaya, Tokyo (JP); Atsushi Hirashima, Tokyo (JP); Hidefumi Harada, Tokyo (JP); Maki Ito, Tokyo (JP); Jun-ya Hayakawa, Tokyo (JP); Takehiko Isobe, Tokyo (JP); Hongyu Liu, Tokyo (JP); Hiroki Furuhashi, Tokyo (JP); Yousuke Shinkai, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 15/032,763

(22) PCT Filed: Nov. 12, 2014

(86) PCT No.: PCT/JP2014/079927
§ 371 (c)(1),
(2) Date: Apr. 28, 2016

(87) PCT Pub. No.: WO2015/072473
PCT Pub. Date: May 21, 2015

(65) Prior Publication Data
US 2016/0272757 A1  Sep. 22, 2016

(30) Foreign Application Priority Data
Nov. 15, 2013 (JP) .................................. 2013-236913

(51) Int. Cl.
*C08G 79/00* (2006.01)
*C08G 64/06* (2006.01)
(Continued)

(52) U.S. Cl.
CPC ........... *C08G 64/06* (2013.01); *C08G 64/205* (2013.01); *C08G 64/305* (2013.01); *C08G 64/307* (2013.01)

(58) Field of Classification Search
CPC ........ C08G 63/00; C08G 64/00; C08G 64/04; C08L 69/00; C08L 101/00; C08K 5/42
See application file for complete search history.

(56) References Cited

U.S. PATENT DOCUMENTS

| 5,847,011 A * | 12/1998 | Terado ................... C08G 81/00 521/48 |
| 2013/0197166 A1 | 8/2013 | Isahaya et al. |
| 2014/0206826 A1 | 7/2014 | Isahaya et al. |

FOREIGN PATENT DOCUMENTS

| EP | 1 760 106 | 3/2007 |
| EP | 2 712 880 | 4/2014 |

(Continued)

OTHER PUBLICATIONS

International Search Report issued in Patent Application No. PCT/JP2014/079927, dated Dec. 9, 2014.
(Continued)

*Primary Examiner* — Shane Fang
(74) *Attorney, Agent, or Firm* — Greenblum & Bernstein, P.L.C.

(57) ABSTRACT

The present invention is to provide a process for producing a high molecular-weight aromatic polycarbonate resin, the process includes mixing a dialcohol compound represented by the following Formula (1) with a first catalyst to obtain a catalyst composition; mixing the obtained catalyst composition with an aromatic polycarbonate prepolymer to obtain a prepolymer mixture; and obtaining a high molecular-weight aromatic polycarbonate by subjecting the obtained prepolymer mixture to heating treatment under reduced pressure condition. In the Formula (1), $R^1$ to $R^4$ each independently represent a hydrogen atom, an alkyl group and the like. Q represents a divalent group or a single bond.

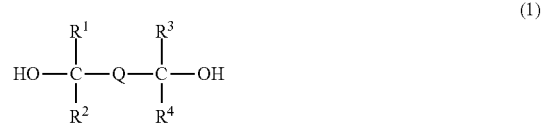

15 Claims, 1 Drawing Sheet

(51) Int. Cl.
*C08G 64/30* (2006.01)
*C08G 64/20* (2006.01)

(56) References Cited

FOREIGN PATENT DOCUMENTS

| | | |
|---|---|---|
| JP | 10-139876 | 5/1989 |
| JP | 08-333446 | 12/1996 |
| JP | 10-218985 | 8/1998 |
| JP | 2004-315747 | 11/2004 |
| WO | 2011/062220 | 5/2011 |
| WO | 2012/157766 | 11/2012 |

OTHER PUBLICATIONS

Extended European Search Report issued in European Patent Application No. 14861338.3, dated Jun. 9, 2017.

* cited by examiner

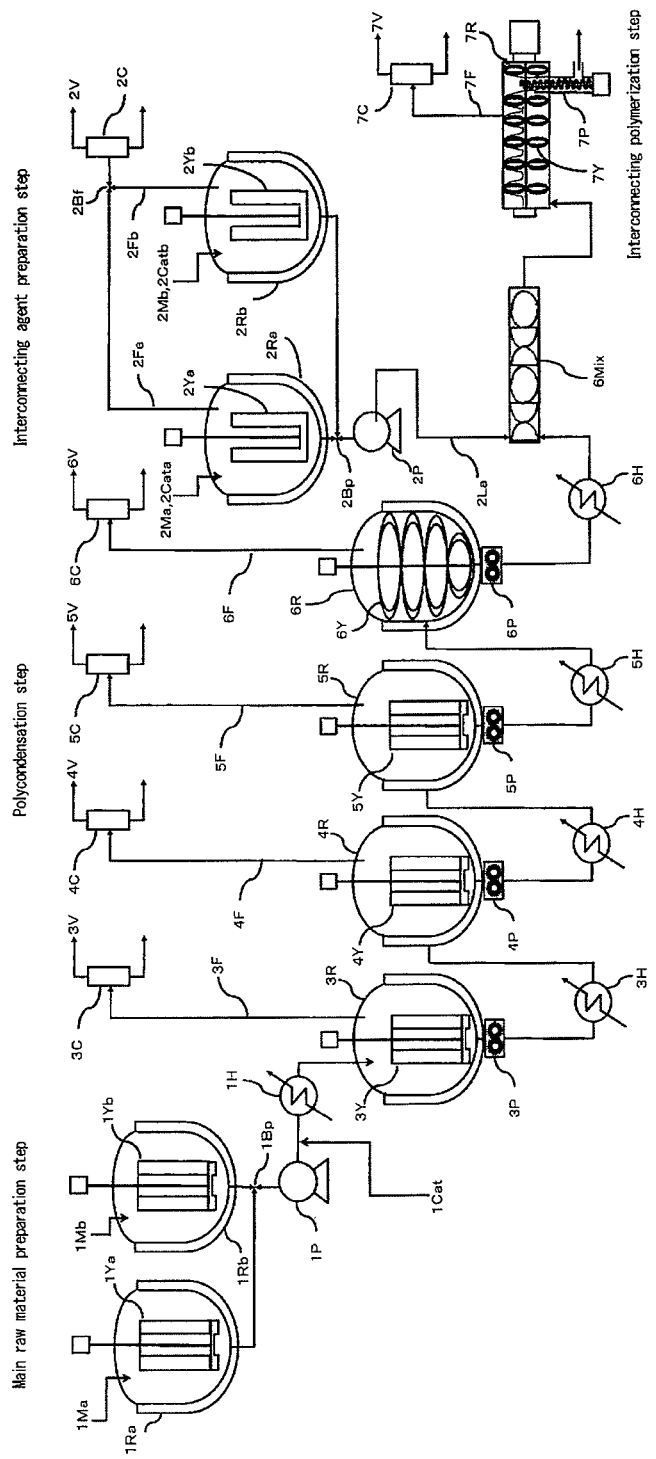

PROCESS FOR PRODUCING A HIGH MOLECULAR-WEIGHT AROMATIC POLYCARBONATE RESIN

TECHNICAL FIELD

The present invention relates to a process for producing a high molecular-weight aromatic polycarbonate resin.

BACKGROUND ART

Polycarbonate resins have excellent heat resistance, impact resistance and transparency, and are widely used in many fields. There have conventionally been made many studies on the process for producing a polycarbonate resin. For example, there has been proposed a process for producing a high molecular-weight aromatic polycarbonate resin, which can increase the molecular weight to a sufficient level while maintaining the good quality inherent of an aromatic polycarbonate resin (see, for example, International Publication No. WO2012/157766).

It has been known that a polycarbonate obtained by a melt polymerization method generally contains heterologous structures spontaneously generated, and a transesterification catalyst, such as an alkali metal or an alkaline earth metal, used in the melt polymerization method has been known as one of the causes increasing the heterologous structures generated. In connection with this, there has been proposed a process for producing an aromatic polycarbonate resin, which has a multi-stage reaction step, and in which a required amount of a transesterification catalyst is appropriately additionally provided (see, for example, Japanese Patent Application Kokai Publication No. H08-333446).

PRIOR ART DOCUMENTS

Patent Documents

Patent document 1: International Publication No. WO2012/157766
Patent document 2: Japanese Patent Application Kokai Publication No. H08-333446

SUMMARY OF THE INVENTION

Problems to be Solved by the Invention

However, the conventional process for producing a polycarbonate resin cannot satisfactorily suppress the generation of heterologous structures. Accordingly, a task to be achieved by the present invention is to provide an improved process for producing a high molecular-weight aromatic polycarbonate resin, which process can economically advantageously produce a high molecular-weight aromatic polycarbonate resin having suppressed the generation of heterologous structures.

Means to Solve the Problems

The present inventors have conducted extensive and intensive studies with a view toward solving the above-mentioned problems. As a result, it has been found that the problems can be solved by feeding a catalyst used for increasing the molecular weight by a specific feeding method in the step in which an aromatic polycarbonate prepolymer is reacted with a dialcohol compound to interconnect the molecules of the aromatic polycarbonate prepolymer so as to increase the molecular weight of the prepolymer (interconnecting and molecular-weight increasing reaction), and the present invention has been completed. Specific means for solving the above-mentioned problems is as described below, and the present invention involves the following embodiments.

(1) A process for producing a high molecular-weight aromatic polycarbonate resin, wherein the process includes: a step of mixing a dialcohol compound represented by the following Formula (1) with a first catalyst to obtain a catalyst composition; a step of mixing the obtained catalyst composition with an aromatic polycarbonate prepolymer to obtain a prepolymer mixture; and a molecular weight increasing step of subjecting the obtained prepolymer mixture to heating treatment under reduced pressure conditions to obtain a high molecular-weight aromatic polycarbonate:

wherein, in Formula (1), $R^1$ to $R^4$ each independently represent a hydrogen atom, a halogen atom, or a linear or branched alkyl group having 1 to 5 carbon atoms; and Q represents a divalent group comprising at least one member selected from the group consisting of an aliphatic hydrocarbon group, an aromatic hydrocarbon group, an oxygen atom, a sulfur atom, a sulfonic group, a sulfoxide group, a carbonyl group, a dialkylsilyl group, and a diarylsilyl group and optionally having a substituent, or a single bond.

(2) The process described in (1), wherein the catalyst composition has been subjected to dehydration treatment or devolatilization treatment.

(3) The process described in (1) or (2), wherein the first catalyst is at least one member selected from the group consisting of alkali metal salts and alkaline earth metal salts.

(4) The process described in any one of (1) to (3), further includes a step of subjecting an aromatic dihydroxy compound and a carbonate diester compound to polycondensation reaction in the presence of a second catalyst to obtain the aromatic polycarbonate prepolymer.

(5) The process described in (4), wherein the molar ratio of the first catalyst and the second catalyst is from 1:9 to 9:1.

(6) The process described in (4) or (5), wherein the total amount of the first catalyst and the second catalyst is $1 \times 10^{-6}$ mol or less per 1 mol of the aromatic dihydroxy compound.

(7) The process described in any one of (4) to (6), wherein the step of obtaining the aromatic polycarbonate prepolymer is conducted in coexistence with a cocatalyst.

(8) The process described in any one of (1) to (7), wherein the dialcohol compound is represented by the following Formula (1a):

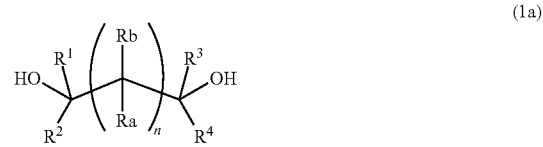

wherein, in Formula (1a), Ra and Rb each independently represent a hydrogen atom, a halogen atom, a linear or branched alkyl group having 1 to 30 carbon atoms and optionally including an oxygen atom or a halogen atom, a cycloalkyl group having 3 to 30 carbon atoms and optionally including an oxygen atom or a halogen atom, an aryl group having 6 to 30 carbon atoms and optionally including an oxygen atom or a halogen atom, or an alkoxy group having 1 to 15 carbon atoms and optionally including an oxygen atom or a halogen atom, and Ra and Rb are optionally bonded to each other to form a ring; $R^1$ to $R^4$ each independently represent a hydrogen atom, a halogen atom, or a linear or branched alkyl group having 1 to 5 carbon atoms; and n represents an integer of 0 to 30.

(9) The process described in any one of (1) to (8), wherein the dialcohol compound is represented by the following Formula (1b):

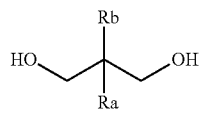

wherein, in Formula (1b), Ra and Rb each independently represent a hydrogen atom, a halogen atom, a linear or branched alkyl group having 1 to 30 carbon atoms and optionally including an oxygen atom or a halogen atom, a cycloalkyl group having 3 to 30 carbon atoms and optionally including an oxygen atom or a halogen atom, an aryl group having 6 to 30 carbon atoms and optionally including an oxygen atom or a halogen atom, or an alkoxy group having 1 to 15 carbon atoms and optionally including an oxygen atom or a halogen atom, and Ra and Rb are optionally bonded to each other to form a ring.

(10) The process described in (9), wherein the dialcohol compound is selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol, and 2-methyl-2-propylpropane-1,3-diol.

(11) The process described in any one of (1) to (10), further including a cyclic carbonate removal step of removing at least part of a cyclic carbonate formed in the molecular weight increasing step to the outside of the reaction system.

(12) The process described in (11), wherein the cyclic carbonate removal step is a step of removing a distillate containing at least part of a cyclic carbonate formed in the molecular weight increasing step to the outside of the reaction system.

(13) The process described in (11) or (12), wherein the cyclic carbonate is a compound represented by the following Formula (2a):

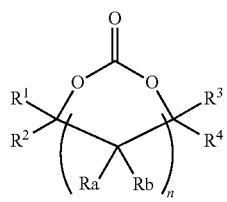

wherein, in Formula (2a), Ra and Rb each independently represent a hydrogen atom, a halogen atom, a linear or branched alkyl group having 1 to 30 carbon atoms and optionally including an oxygen atom or a halogen atom, a cycloalkyl group having 3 to 30 carbon atoms and optionally including an oxygen atom or a halogen atom, an aryl group having 6 to 30 carbon atoms and optionally including an oxygen atom or a halogen atom, or an alkoxy group having 1 to 15 carbon atoms and optionally including an oxygen atom or a halogen atom, and Ra and Rb are optionally bonded to each other to form a ring; $R^1$ to $R^4$ each independently represent a hydrogen atom, a halogen atom, or a linear or branched alkyl group having 1 to 5 carbon atoms; and n represents an integer of 0 to 30.

(14) The process described in (11) or (12), wherein the cyclic carbonate is a compound represented by the following Formula (2b):

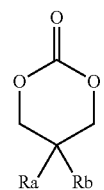

wherein, in Formula (2b), Ra and Rb each independently represent a hydrogen atom, a linear or branched alkyl group having 1 to 30 carbon atoms and optionally including an oxygen atom or a halogen atom, a cycloalkyl group having 3 to 30 carbon atoms and optionally including an oxygen atom or a halogen atom, an aryl group having 6 to 30 carbon atoms and optionally including an oxygen atom or a halogen atom, or an alkoxy group having 1 to 15 carbon atoms and optionally including an oxygen atom or a halogen atom, and Ra and Rb are optionally bonded to each other to form a ring.

Advantageous Effects of the Invention

In the present invention, there can be provided an improved process for producing a high molecular-weight aromatic polycarbonate resin, which process can economically advantageously produce a high molecular-weight aromatic polycarbonate resin having suppressed the generation of heterologous structures.

BRIEF DESCRIPTION OF THE DRAWING

FIG. 1 A diagrammatic view showing an example of the apparatus for production used in the process according to the present embodiment.

MODE FOR CARRYING OUT THE INVENTION

In the present specification, the term "step" comprehends not only an independent step but also a combination of steps which are not distinct from one another as long as such combined steps can fulfill the desired purposes. Further, all the ranges of values indicated with the preposition "to" include the values before and after the preposition "to" as the minimum value and the maximum value. Furthermore, when a plurality of substances belong to any one component in a specific composition, the content of such a component in the composition means the total content of the plurality of substances present in the composition unless otherwise mentioned. Hereinbelow, an embodiment of the present invention will be described.

Process for Producing a High Molecular-Weight Aromatic Polycarbonate Resin

The process for producing a high molecular-weight aromatic polycarbonate resin according to the present embodiment includes a step of mixing a dialcohol compound represented by Formula (1) below with a first catalyst to obtain a catalyst composition (hereinafter, this step is frequently referred to as "first step"); a step of mixing the obtained catalyst composition with an aromatic polycarbonate prepolymer to obtain a prepolymer mixture (hereinafter, this step is frequently referred to as "second step"); and a molecular weight increasing step of subjecting the obtained prepolymer mixture to heating treatment under reduced pressure conditions to obtain a high molecular-weight aromatic polycarbonate (hereinafter, this step is frequently referred to as "third step").

In Formula (1) below, $R^1$ to $R^4$ each independently represent a hydrogen atom, a halogen atom, or a linear or branched alkyl group having 1 to 5 carbon atoms; and Q represents a divalent group comprising at least one member selected from the group consisting of an aliphatic hydrocarbon group, an aromatic hydrocarbon group, an oxygen atom, a sulfur atom, a sulfonic group, a sulfoxide group, a carbonyl group, a dialkylsilyl group, and a diarylsilyl group and optionally having a substituent, or a single bond.

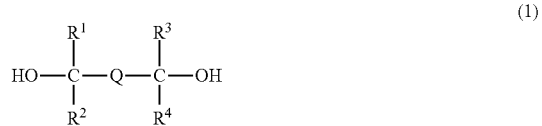

(1)

In the process according to the present embodiment, by interconnecting the molecules of an aromatic polycarbonate prepolymer (hereinafter, frequently referred to simply as "prepolymer") using a catalyst composition so as to increase the molecular weight of the prepolymer, a high molecular-weight aromatic polycarbonate resin having further suppressed the generation of heterologous structures and having excellent quality can be economically advantageously produced. Further, the high molecular-weight aromatic polycarbonate resin obtained by the process according to the present embodiment has a satisfactorily increased molecular weight and has a low N value and excellent hue.

The reason for this can be presumed, for example, as follows. When a first catalyst for catalyzing the molecular weight increasing reaction (hereinafter, frequently referred to simply as "catalyst") is fed to an aromatic polycarbonate prepolymer in the form of a catalyst composition obtained by mixing the first catalyst with a dialcohol compound, stably feeding the catalyst and the dialcohol compound is facilitated, and further the catalyst can be fed with excellent dispersibility. Consequently, the generation of heterologous structures is effectively suppressed, and further an occurrence of a cleavage (scission) reaction of the prepolymer main chain is effectively suppressed, making it possible to reduce the period of time required for the interconnecting and molecular-weight increasing reaction. In addition, a local increase of the catalyst concentration in the prepolymer mixture can be suppressed, so that the generation of heterologous structures in the prepolymer per se is effectively suppressed. Further, when adding the catalyst, it is not necessary to dilute the catalyst with, e.g., water or an organic solvent, and therefore, for example, fluctuations of the reaction conditions (for example, a lowering of the degree of vacuum in the reactor) and an occurrence of a side reaction due to the component which does not participate in the reaction can be suppressed, permitting the interconnecting and molecular-weight increasing reaction to proceed more efficiently while suppressing the generation of heterologous structures.

In a conventional melt polymerization method, there is a case in which a catalyst is added in the form of a mixture of the catalyst and a solvent, such as an organic solvent, or an aromatic monohydroxy compound (phenolic compound) which is a raw material for a prepolymer. However, in the conventional method, it is likely that a prolonged period of time is required for increasing the molecular weight, and that the molecular weight increasing does not satisfactorily proceed. Further, when a masterbatch obtained by mixing a catalyst into a prepolymer is used, it is likely that the catalyst is present at a high concentration in the masterbatch being prepared, leading to a lowering of the molecular weight. By contrast, in the present embodiment, by using a catalyst in the form of a mixture obtained by mixing the catalyst with a dialcohol compound, a problem of the lowering of the molecular weight caused in the prior art can be solved.

First Step

In the first step, a dialcohol compound represented by Formula (1) above is mixed with a first catalyst to obtain a catalyst composition. By mixing the first catalyst in the form of a catalyst composition into an aromatic polycarbonate prepolymer, the first catalyst can be uniformly distributed in the resultant prepolymer mixture.

Details of the dialcohol compound and first catalyst contained in the catalyst composition will be described later.

With respect to the method for mixing the dialcohol compound with the first catalyst in the first step, there is no particular limitation. As examples of the methods for mixing them, there can be mentioned a method in which the dialcohol compound is directly mixed with the first catalyst, and a method in which the first catalyst is dissolved or dispersed in a solvent to prepare a catalyst solution or dispersion, and the prepared catalyst solution or dispersion is mixed with the dialcohol compound. Of these, preferred is a method in which the catalyst solution or dispersion is mixed with the dialcohol compound.

With respect to the solvent used for preparing the catalyst solution or dispersion, there is no particular limitation as long as it is a solvent capable of dissolving therein at least part of the first catalyst. Especially, the solvent is preferably a solvent which can be handled at room temperature and which has low reactivity and an appropriate boiling point such that the solvent can be removed by volatilizing it.

As a solvent, an organic solvent, for example, an alcohol solvent, such as methanol, ethanol, or isopropyl alcohol; a ketone solvent, such as acetone or methyl ethyl ketone; an ether solvent, such as diethyl ether or diisopropyl ether; an aliphatic hydrocarbon solvent, such as pentane, hexane, or heptane; an aromatic hydrocarbon solvent, such as benzene, toluene, or xylene; or a halogenated hydrocarbon solvent, such as dichloromethane or chloroform, a phenolic compound, water, or a mixture thereof can be used.

It is preferred that the solvent has a low content of metal components. With respect to the content of metal components in the solvent, for example, the content of alkali metals in the solvent is more preferably 10 ppm or less, and, as the content of heavy metals in the solvent, the content iron is more preferably 3 ppm or less, the nickel content is more preferably 2 ppm or less, and the chromium content is more preferably 1 ppm or less. For example, when water is used as the solvent, ion-exchanged water or distilled water is preferably used.

The concentration of the first catalyst in the catalyst solution or dispersion can be appropriately selected, and can be, for example, 0.0005 to 0.05 mol/L, and is preferably 0.001 to 0.01 mol/L.

The first step may be conducted either at room temperature or while heating. When the first step is conducted while heating, the heating can be made so that the temperature of the obtained catalyst composition becomes, for example, the melting point of the dialcohol compound or higher, preferably becomes the melting point of the dialcohol compound to a temperature higher than the melting point by 80° C., more preferably becomes the melting point of the dialcohol compound to a temperature higher than the melting point by 50° C.

It is preferred that the first step further includes the step of subjecting the catalyst composition to dehydration treatment or devolatilization treatment. When subjecting the catalyst composition to dehydration treatment or devolatilization treatment, the catalyst composition is in a dry state such that the content of, for example, water or an organic solvent in the catalyst composition is reduced, making it possible to cause the molecular weight increasing reaction to efficiently proceed. Further, the formed catalyst composition is more uniform and hence can be more stably fed, enabling more stable production operation. Thus, a high molecular-weight aromatic polycarbonate resin having higher quality can be produced with higher productivity.

The dehydration treatment or devolatilization treatment may be performed either upon mixing the dialcohol compound and the first catalyst with each other or after mixing them.

With respect to the dehydration treatment or devolatilization treatment, there is no particular limitation as long as at least part of water and other volatile components other than the dialcohol compound and first catalyst contained in the catalyst composition can be removed, and the dehydration treatment or devolatilization treatment can be appropriately selected from dehydration or devolatilization methods generally used.

Specific examples of the dehydration treatments or devolatilization treatments can include a method in which the catalyst composition is contacted with a dehydrating agent, a method in which the catalyst composition is placed under a reduced pressure, a method in which the catalyst composition is heated, and a method in which the catalyst composition is heated under a reduced pressure. These methods may be employed individually or in combination. Of these, as the dehydration treatment or devolatilization treatment, preferred is a method in which the catalyst composition is heated under a reduced pressure.

As the dehydrating agent, a dehydrating agent generally used can be used. Specific examples of the dehydrating agents include silica gel, calcium chloride, diphosphorus pentoxide, molecular sieves, sodium sulfate, and magnesium sulfate. When the catalyst composition is placed under a reduced pressure, the degree of vacuum is, for example, 300 torr (40 kPa) or less, preferably 100 torr (13.3 kPa) or less, more preferably 0.01 torr (1.3 Pa) to 100 torr (13.3 kPa). When the catalyst composition is heated, the temperature of the catalyst composition is, for example, the melting point of the dialcohol compound or higher, preferably the melting point of the dialcohol compound to a temperature higher than the melting point by 80° C., more preferably the melting point of the dialcohol compound to a temperature higher than the melting point by 50° C., and the temperature of the catalyst composition can be, for example, 50 to 120° C., preferably 60 to 90° C. When the catalyst composition is heated under a reduced pressure, the degree of vacuum and the temperature are, for example, 300 torr (40 kPa) or less and the melting point of the dialcohol compound or higher, preferably 0.01 torr (1.3 Pa) to 100 torr (13.3 kPa) and the melting point of the dialcohol compound to a temperature higher than the melting point by 50° C.

The treatment time for the dehydration treatment or devolatilization treatment can be appropriately selected depending on, for example, the treatment method. The treatment time is, for example, 10 to 70 minutes, preferably 30 to 60 minutes.

As an apparatus for performing the first step, for example, a stirring tank having stirring means and heating means can be used. With respect to the stirring means, there is no particular limitation, and the stirring means can be appropriately selected from general stirring apparatuses. As the stirring means, a general stirring blade, for example, an anchor blade or a paddle blade can be used. The stirring tank preferably further has vacuum means.

With respect to the proportion of the dialcohol compound and first catalyst contained in the catalyst composition, there is no particular limitation, and the proportion can be appropriately selected depending on, for example, the type of the first catalyst. The proportion of the first catalyst to the dialcohol compound (first catalyst/dialcohol compound; % by mass) is, for example, 0.0001 to 0.1% by mass, preferably 0.0005 to 0.01% by mass, more preferably 0.0005 to 0.007% by mass, especially preferably 0.001 to 0.005% by mass.

The catalyst composition may contain a component other than the dialcohol compound and first catalyst. Examples of other components include water, an organic solvent, and a phenolic compound.

The content of the component other than the dialcohol compound and first catalyst contained in the catalyst composition is preferably 3% by mass or less, more preferably 1% by mass or less, further preferably 0.3% by mass or less, especially preferably 0.03% by mass or less, based on the mass of the catalyst composition.

The content of water in the catalyst composition can be measured by, for example, a Karl Fischer method. The content of, e.g., an organic solvent or a phenolic compound in the catalyst composition can be measured by, for example, gas chromatography.

The dialcohol compound contained in the catalyst composition means a compound having two alcoholic hydroxy groups respectively bonded to non-aromatic carbon atoms. The dialcohol compound may have in the molecular structure thereof a partial structure containing an aromatic ring, but a phenolic compound having a hydroxy group bonded to an aromatic ring is not included in the dialcohol compound.

The dialcohol compound used in the process according to the present embodiment is represented by the following Formula (1).

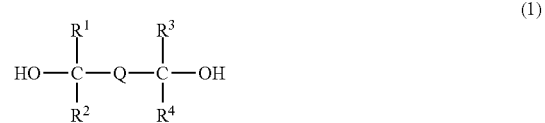

In Formula (1), each of $R^1$ to $R^4$ independently represents a hydrogen atom, a halogen atom, or a linear or branched alkyl group with 1 to 5 carbon atoms. From the viewpoint of the reaction efficiency of the molecular weight increasing reaction, each of $R^1$ to $R^4$ is independently preferably a hydrogen atom, a fluorine atom, a chlorine atom, or an alkyl group with 1 to 3 carbon atoms, more preferably a hydrogen atom, a fluorine atom, or a methyl group, more preferably a hydrogen atom.

Further, in $R^1$ to $R^4$, it is preferred that at least one of $R^1$ and $R^2$ and at least one of $R^3$ and $R^4$ are a hydrogen atom, and it is more preferred that all of $R^1$ to $R^4$ are a hydrogen atom. That is, the dialcohol compound represented by Formula (1) is preferably a secondary dialcohol compound or a primary dialcohol compound, more preferably a primary dialcohol compound.

Q represents a divalent group including at least one member selected from the group consisting of an aliphatic hydrocarbon group, an aromatic hydrocarbon group, an oxygen atom, a sulfur atom, a sulfonic group, a sulfoxide group, a carbonyl group, a dialkylsilyl group, and a diarylsilyl group and optionally having a substituent, or a single bond.

Examples of the aliphatic hydrocarbon groups represented by Q include a divalent group derived from a linear or branched alkane having 1 to 20 carbon atoms, a divalent group derived from a linear or branched alkene having 1 to 20 carbon atoms, and a group derived from a cycloalkane or cycloalkene having 3 to 30 carbon atoms. The divalent group derived from an alkane or the like means a group formed by removing two hydrogen atoms from an alkane or the like, and the positions of the alkane or the like from which hydrogen atoms are removed are not particularly limited. The cycloalkane and cycloalkene may be a crosslinked ring, such as a bicycloalkane or a tricycloalkane, or a fused ring formed with, e.g., another aliphatic ring or aromatic ring.

Examples of the aromatic hydrocarbon groups represented by Q include divalent aromatic hydrocarbon groups having 6 to 40 carbon atoms.

Q may be a divalent group formed from a combination of at least two members selected from the group consisting of an aliphatic hydrocarbon group, an aromatic hydrocarbon group, an oxygen atom, a sulfur atom, a sulfonic group, a sulfoxide group, a carbonyl group, a dialkylsilyl group, and a diarylsilyl group. The groups formed from the above combination include linear divalent groups, such as an alkyleneoxyalkyl group, an alkylenesulfonylalkyl group, a biphenylene group, a polyarylene group, and a polycarbonate group, and cyclic divalent groups, such as an oxacycloalkylene group, a dioxacycloalkylene group, a dioxacycloalkylidene group, and a fluorenylidene group.

Q may have a substituent. Examples of substituents include an alkyl group having 1 to 12 carbon atoms, an alkoxy group having 1 to 10 carbon atoms, an aryl group having 6 to 10 carbon atoms, an aryloxy group having 6 to 10 carbon atoms, and halogen atoms, such as a fluorine atom and a chlorine atom. When Q has a substituent, the number of the substituent(s) is not particularly limited as long as substitution can be made.

The dialcohol compound represented by Formula (1) is preferably represented by the following Formula (1a).

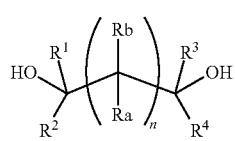

(1a)

In Formula (1a), Ra and Rb each independently represent a hydrogen atom, a halogen atom, a linear or branched alkyl group having 1 to 30 carbon atoms and optionally including an oxygen atom or a halogen atom, a cycloalkyl group having 3 to 30 carbon atoms and optionally including an oxygen atom or a halogen atom, an aryl group having 6 to 30 carbon atoms and optionally including an oxygen atom or a halogen atom, or an alkoxy group having 1 to 15 carbon atoms and optionally including an oxygen atom or a halogen atom, and Ra and Rb are optionally bonded to each other to form a ring. A preferred halogen atom is a fluorine atom.

$R^1$ to $R^4$ each independently represent a hydrogen atom, a halogen atom, or a linear or branched alkyl group having 1 to 5 carbon atoms. A preferred halogen atom is a fluorine atom.

The letter n represents an integer of 0 to 30, preferably 1 to 6, more preferably 1 to 3, especially preferably 1.

In Formula (1a), Ra and Rb each independently preferably represent a hydrogen atom, a halogen atom, a linear or branched alkyl group having 1 to 8 carbon atoms, a cycloalkyl group having 3 to 8 carbon atoms, an aryl group having 6 to 10 carbon atoms, or an alkoxy group having 1 to 8 carbon atoms, and Ra and Rb are optionally bonded to each other to form an alicyclic ring having 3 to 8 carbon atoms. A preferred halogen atom is a fluorine atom.

$R^1$ to $R^4$ each independently preferably represent a hydrogen atom, a fluorine atom, or a methyl group.

The letter n preferably represents an integer of 1 to 6.

In Formula (1a), each of Ra and Rb is independently more preferably a hydrogen atom or a linear or branched alkyl group having 1 to 5 carbon atoms, further preferably a linear or branched alkyl group having 1 to 4 carbon atoms. Specific preferred examples include a methyl group, an ethyl group, a propyl group, a n-butyl group, an isobutyl group, and an isopentyl group, and specific more preferred examples include a methyl group, an ethyl group, a propyl group, a n-butyl group, and an isobutyl group. Each of $R^1$ to $R^4$ is more preferably a hydrogen atom. The letter n more preferably represents an integer of 1 to 3.

The dialcohol compound represented by Formula (1) is more preferably a compound represented by Formula (1b) below. In Formula (1b), Ra and Rb are respectively the same as Ra and Rb in Formula (1a).

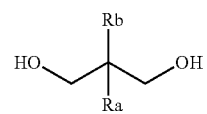

(1b)

In Formula (1b), each of Ra and Rb is independently more preferably a hydrogen atom or a linear or branched alkyl group having 1 to 5 carbon atoms, still more preferably a linear or branched alkyl group having 1 to 4 carbon atoms, further preferably a linear or branched alkyl group having 2 to 4 carbon atoms. Specifically, preferred examples include a methyl group, an ethyl group, a propyl group, a n-butyl group, an isobutyl group, and an isopentyl group, and more preferred examples include an ethyl group, a propyl group, a n-butyl group, and an isobutyl group.

Examples of the dialcohol compounds represented by Formula (1b) include 2-butyl-2-ethylpropane-1,3-diol, 2,2-diisobutylpropane-1,3-diol, 2-ethyl-2-methylpropane-1,3-diol, 2,2-diethylpropane-1,3-diol, 2-methyl-2-propylpropane-1,3-diol, propane-1,3-diol, 2,2-diisoamylpropane-1,3-diol, and 2-methylpropane-1,3-diol, and the dialcohol compound is preferably at least one member selected from the group consisting of these compounds.

Specific examples of the dialcohol compounds represented by Formula (1) above are classified into primary dialcohol compounds and secondary dialcohol compounds as shown below, but the dialcohol compound in the present invention is not limited to the specific examples shown below.

Primary Diol: 2-Hydroxyethoxy Group-Containing Compound

As preferred examples of the dialcohol compound in the present embodiment, there can be mentioned 2-hydroxyethoxy group-containing compounds represented by "HO—$(CH_2)_2$—O—Y—O—$(CH_2)_2$—OH". In this formula, examples of Y's include an organic group (A) and an organic group (B) having structures shown below, an organic group (C) selected from a divalent phenylene group and naphthylene group, and a cycloalkylene group (D) selected from the structural formulae shown below.

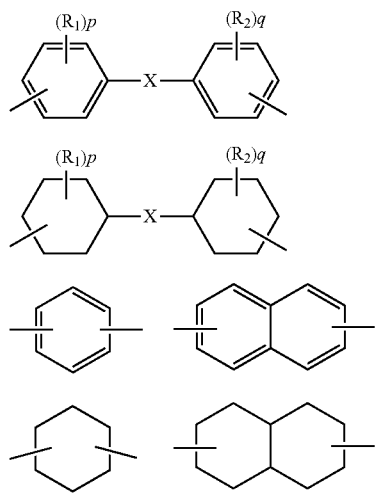

In the above formulae, X represents a single bond or a divalent group selected from the group of structural formulae shown below. Each of $R_1$ and $R_2$ in structural formulae (A) and (B) independently represents a hydrogen atom, an alkyl group having 1 to 4 carbon atoms, a phenyl group, or a cycloalkyl group, and may contain a fluorine atom. $R_1$ and $R_2$ are preferably a hydrogen atom or a methyl group. Each of p and q independently represents an integer of 0 to 4 (preferably 0 to 3).

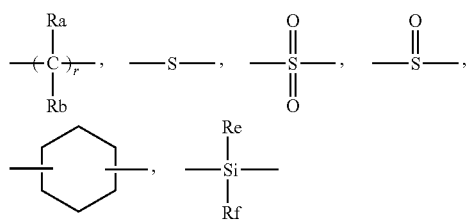

In the above structures, each of Ra and Rb independently represents a hydrogen atom, a linear or branched alkyl group having 1 to 30 carbon atoms, preferably 1 to 12, further preferably 1 to 6, especially preferably 1 to 4, an aryl group having 6 to 12 carbon atoms, or a cycloalkyl group having 6 to 12 carbon atoms, and Ra and Rb may be bonded to each other to form a ring.

As examples of rings that Ra and Rb together form, there can be mentioned an alicyclic ring, a heterocycle (containing an oxygen atom and/or a sulfur atom), and a combination thereof. When Ra and Rb are alkyl groups or are bonded to each other to form a ring, they may contain a fluorine atom.

r represents an integer of 1 to 20, preferably 1 to 12.

Each of Re and Rf independently represents a hydrogen atom, a halogen atom, a linear or branched alkyl group having 1 to 10 carbon atoms, an aryl group having 6 to 12 carbon atoms, a cycloalkyl group having 6 to 12 carbon atoms, and an alkoxy group having 1 to 20 carbon atoms, and Re and Rf may contain a fluorine atom. Further, Re and Rf may be bonded to each other to form a ring. The linear or branched alkyl group is preferably a linear or branched alkyl group having 1 to 6 carbon atoms, more preferably 1 to 4 carbon atoms, especially preferably a methyl group or an ethyl group. The alkoxy group having 1 to 20 carbon atoms is preferably a methoxy group or an ethoxy group.

More specific examples of the dialcohol compounds are shown below. In the formulae below, each of n and m independently represents an integer of 0 to 4. Each of $R_1$ and $R_2$ independently represents a hydrogen atom, a methyl group, an ethyl group, a n-propyl group, an isopropyl group, a butyl group, an isobutyl group, a phenyl group, or a cyclohexyl group.

In the case where Y is organic group A:

Preferred dialcohol compounds in the case where Y is organic group A are shown below.

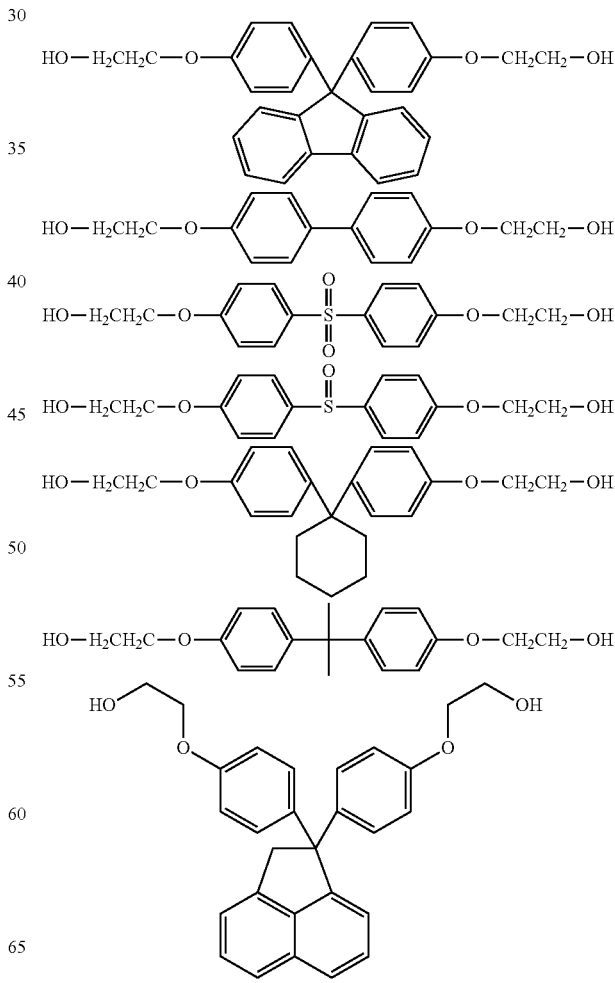

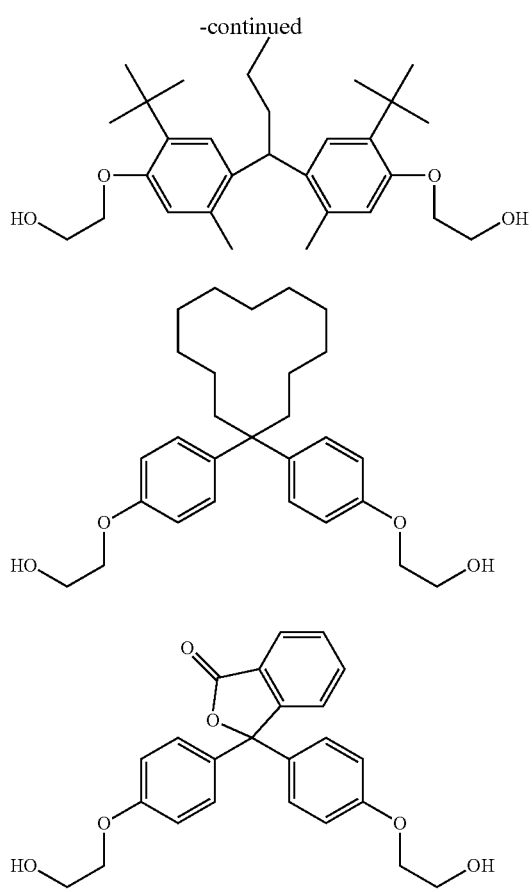

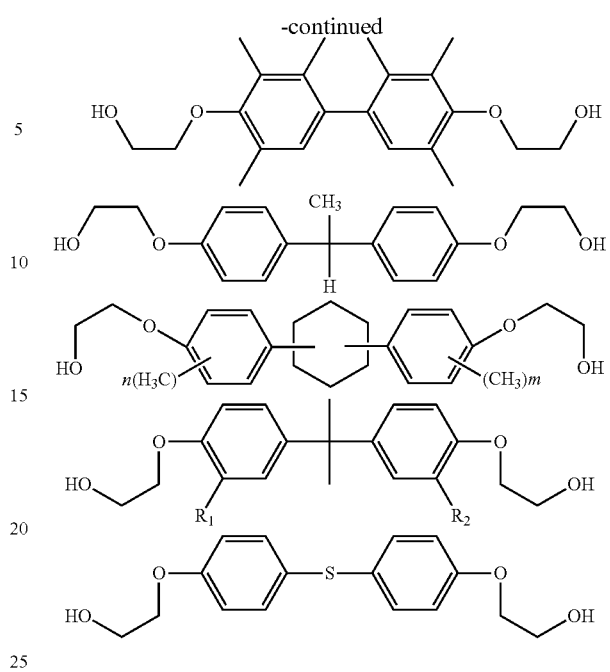

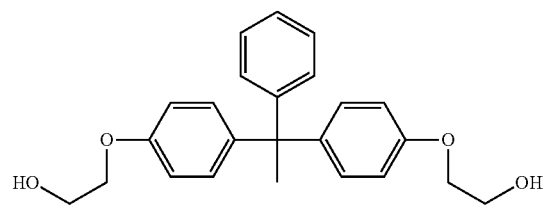

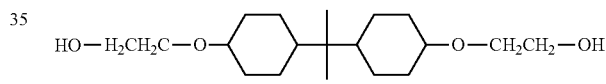

In the case where Y is organic group B:

In the case where Y is organic group B, X preferably represents —CRaRb—(wherein each of Ra and Rb independently represents a hydrogen atom or an alkyl group having 1 to 6 carbon atoms, preferably a methyl group). Specifically, there can be mentioned a compound shown below.

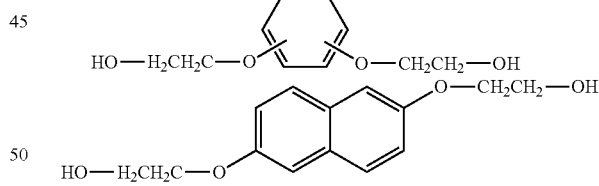

In the case where Y is organic group C:

Preferred dialcohol compounds in the case where Y is organic group C are shown below.

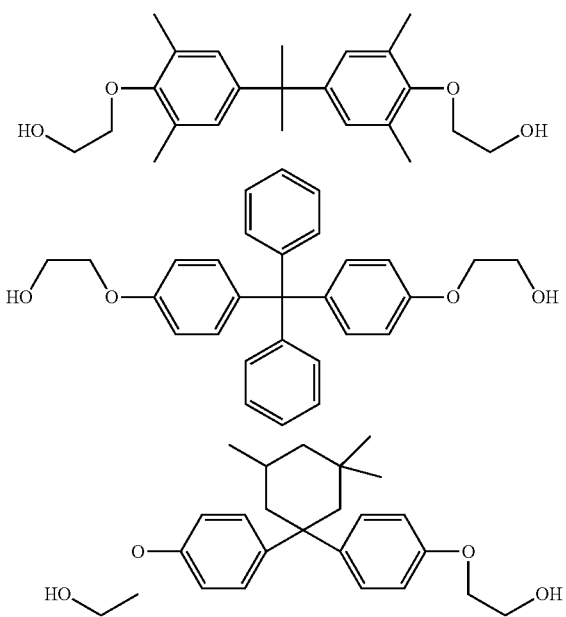

Among the above-mentioned 2-hydroxyethoxy group-containing compounds, especially preferred compounds are shown below.

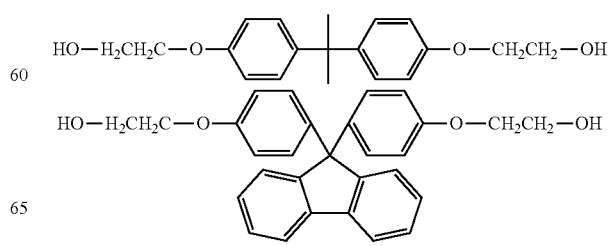

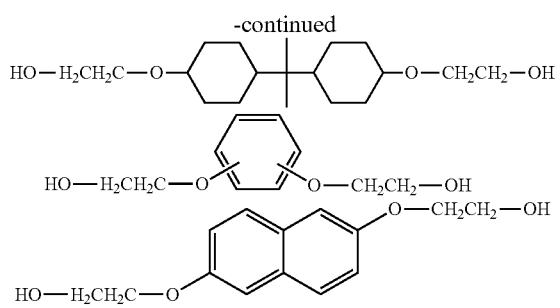

Primary Diol: Hydroxyalkyl Group-Containing Compound

As preferred examples of the dialcohol compound in the present embodiment, there can be mentioned hydroxyalkyl group-containing compounds represented by "HO—$(CH_2)_r$—Z—$(CH_2)_r$—OH". In this formula, r is 1 or 2. That is, the hydroxyalkyl group is a hydroxymethyl group or a hydroxyethyl group.

As examples of Z's, there can be mentioned organic groups shown below.

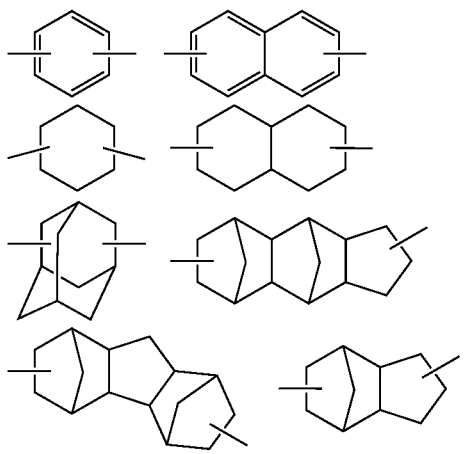

Preferred hydroxyalkyl group-containing compounds are shown below. In the formulae below, each of n and m independently represents an integer of 0 to 4.

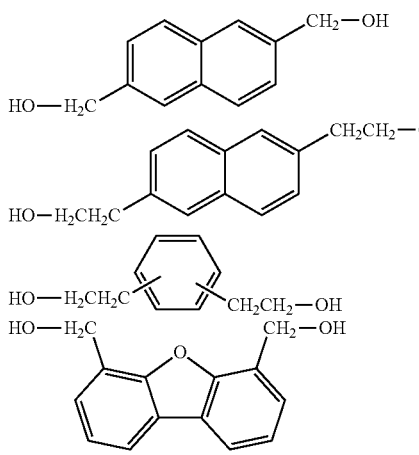

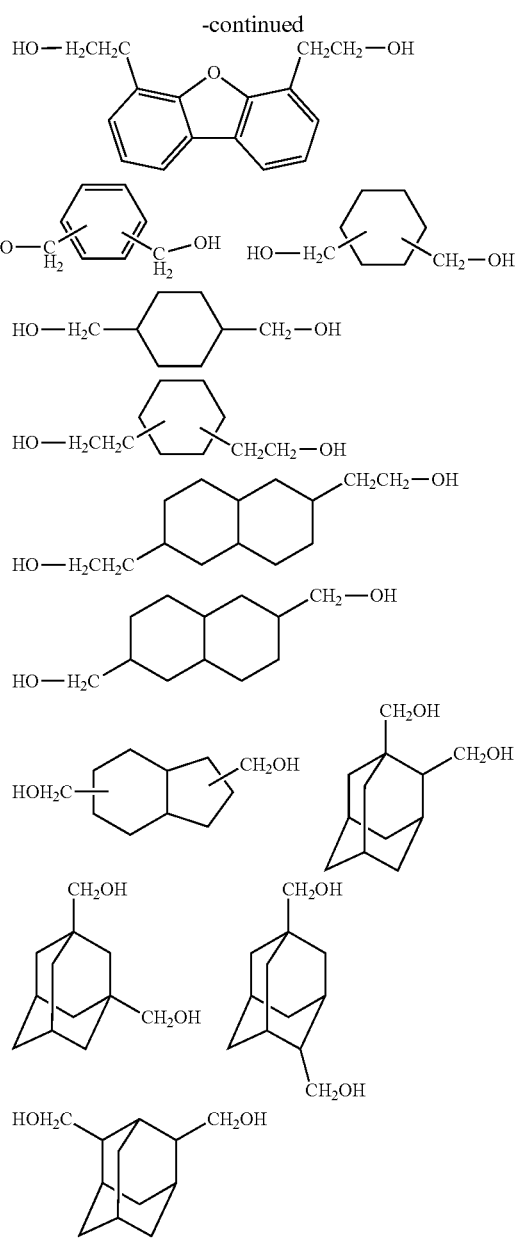

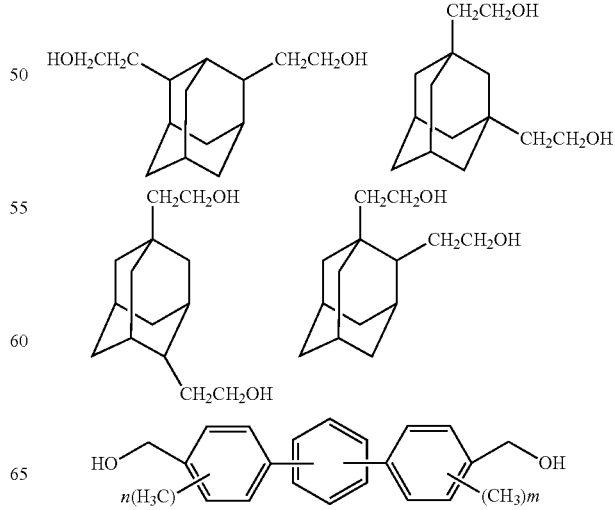

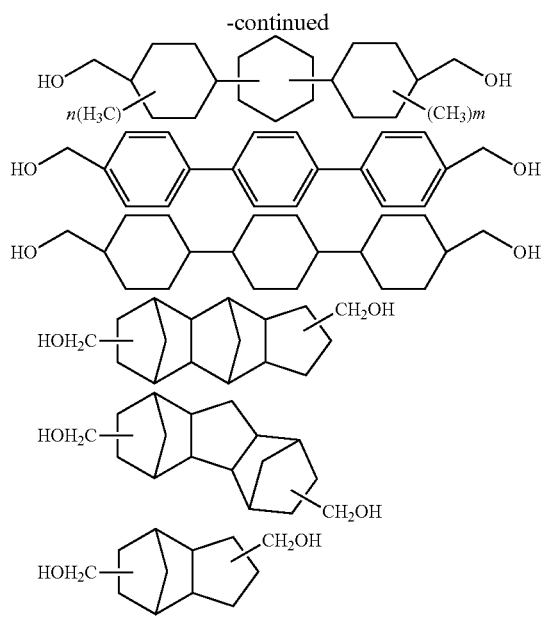

Primary Diol: Carbonate Diol Compound

As preferred examples of the dialcohol compound in the present embodiment, there can be mentioned carbonate diol compounds represented by the formula below.

In the formula below, as examples of R's, there can be mentioned organic groups having structures shown below. In the formula below, n is an integer of 1 to 20, preferably 1 to 2. m is an integer of 3 to 20, preferably 3 to 10.

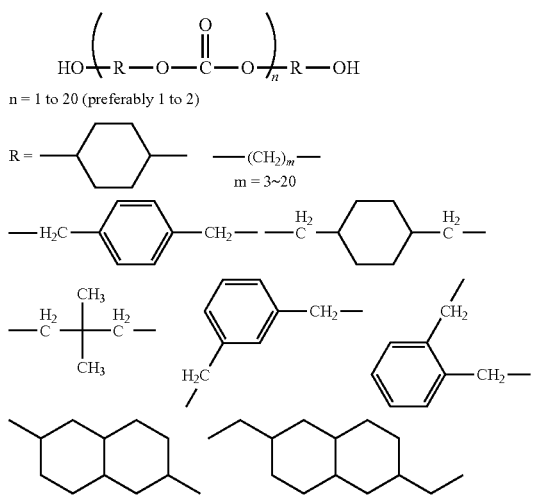

As preferred examples of the above polycarbonate diol compounds, there can be mentioned diols shown below (dimers of cyclohexanedimethanol or neopentyl glycol) and ones included mainly of the diol.

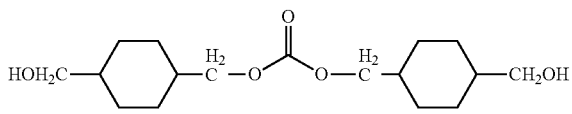

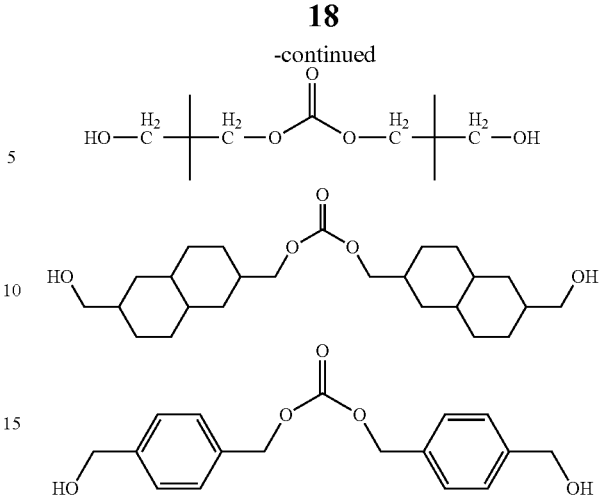

With respect to the dialcohol compound in the present embodiment, a primary diol compound selected from the group consisting of the above-mentioned (i) 2-hydroxyethoxy group-containing compound, (ii) hydroxyalkyl group-containing compound, and (iii) carbonate diol compound is preferably used.

The dialcohol compound is not particularly limited to the above-mentioned specific primary diols, and a primary diol compound other than the above primary diols, or a secondary diol compound can be used. Examples of usable other primary diol compounds and secondary diol compounds are shown below.

In the formulae shown below, each of $R_1$ and $R_2$ is independently a hydrogen atom, a halogen atom, an amino group, a nitro group, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxy group having 6 to 20 carbon atoms, or an aryloxy group having 6 to 20 carbon atoms, preferably a hydrogen atom, a fluorine atom, a methyl group, an ethyl group, a propyl group, an isopropyl group, a n-butyl group, an isobutyl group, a sec-butyl group, a tert-butyl group, a pentyl group, an isoamyl group, a cyclohexyl group, a phenyl group, a benzyl group, a methoxy group, or an ethoxy group.

Each of $R_5$, $R_6$, $R_7$, and $R_8$ independently represents a hydrogen atom or a monovalent alkyl group with 1 to 10 carbon atoms. Each of $R_9$ and $R_{10}$ independently represents a linear or branched alkyl group having 1 to 8 carbon atoms, preferably 1 to 4.

Each of Ra and Rb independently represents a hydrogen atom, a linear or branched alkyl group having 1 to 30 carbon atoms, preferably 1 to 12, further preferably 1 to 6, especially preferably 1 to 4, an aryl group having 6 to 12 carbon atoms, or a cycloalkyl group having 6 to 12 carbon atoms, and Ra and Rb may be bonded to each other to form a ring. Examples of rings include an aromatic ring, an alicyclic ring, a heterocycle (containing oxygen and/or sulfur), and a combination thereof. When Ra and Rb are alkyl groups or are bonded to each other to form a ring, they may contain a fluorine atom.

R' represents an alkylene group having 1 to 10 carbon atoms, preferably 1 to 8. Each of Re and Rf independently represents a hydrogen atom, a halogen atom, a methyl group, an ethyl group, a n-propyl group, an isopropyl group, a butyl group, an isobutyl group, a phenyl group, a methoxy group, or an ethoxy group. m' is an integer of 4 to 20, preferably 4 to 12. m" is an integer of 1 to 10, preferably 1 to 5. e is an integer of 1 to 10.
<Other Primary Diols>
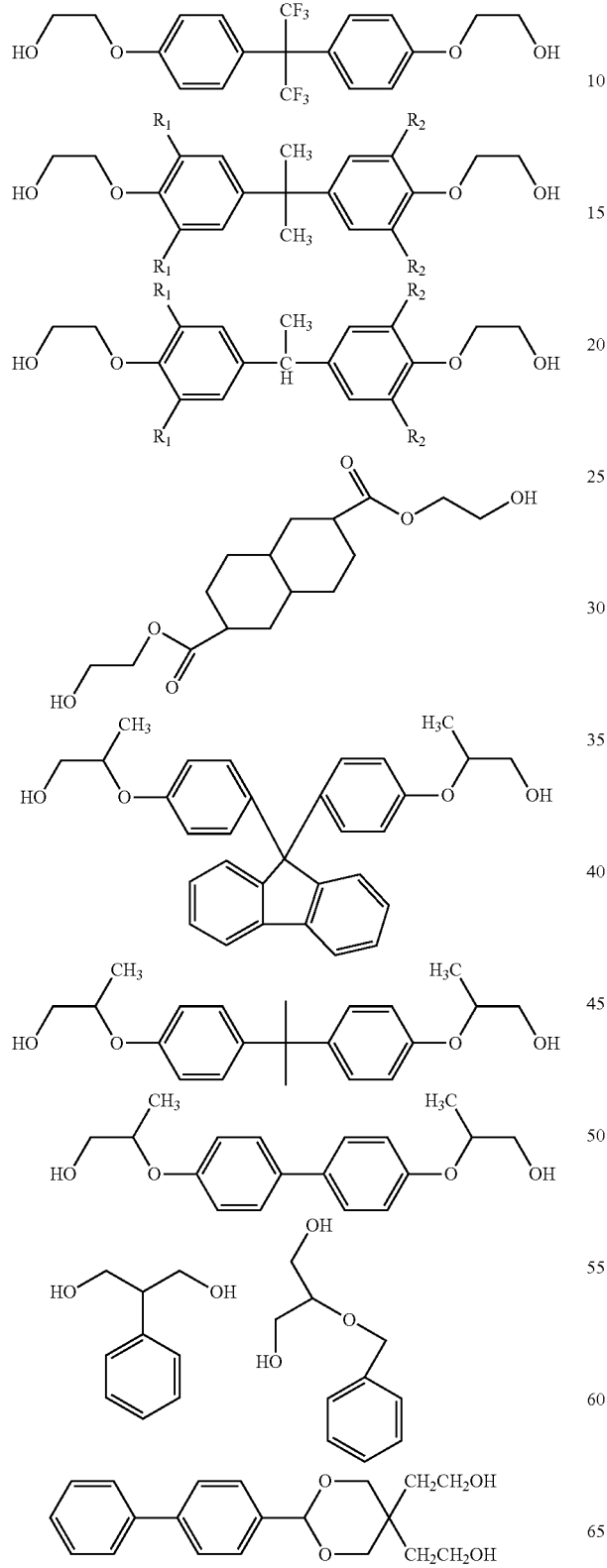
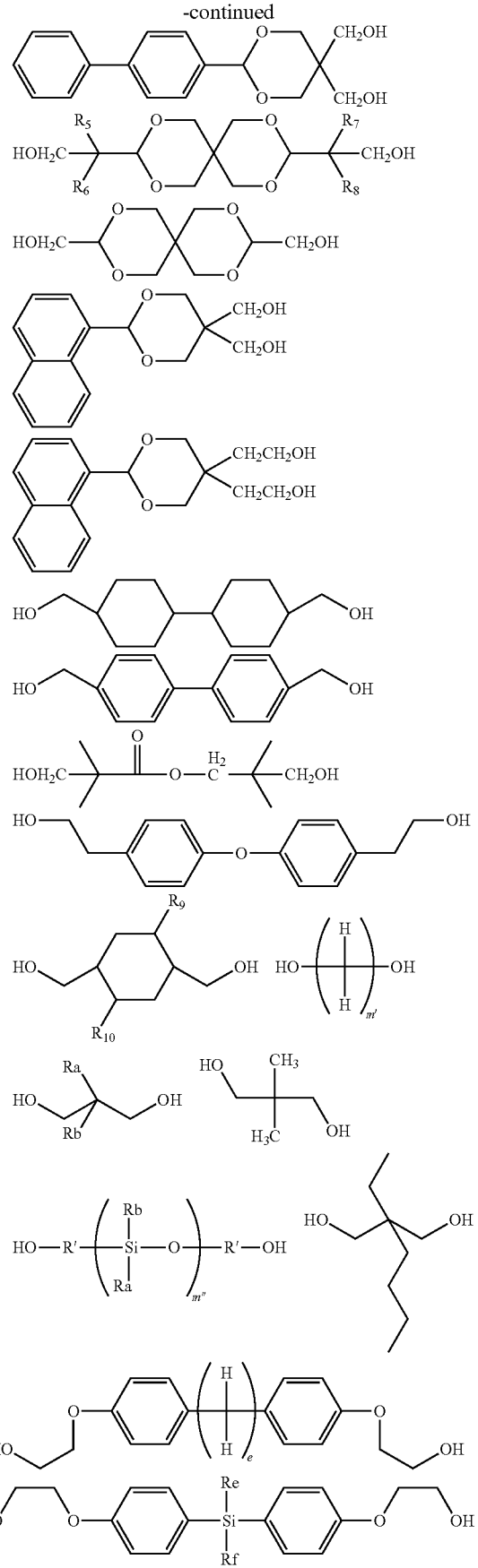

-continued

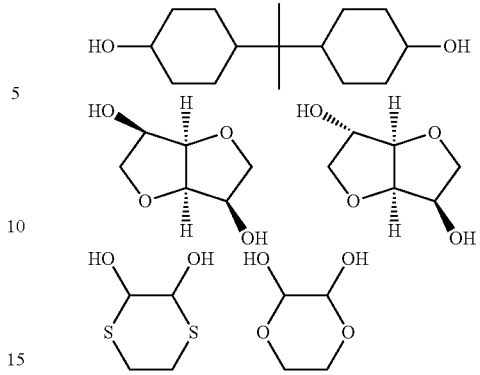

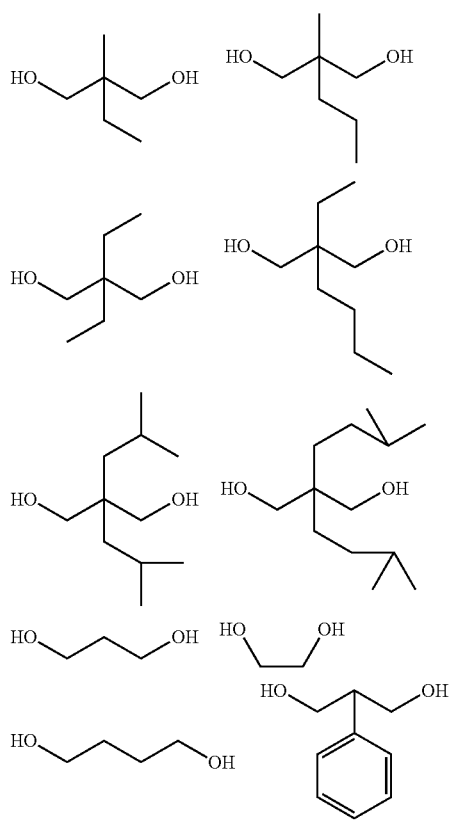

<Secondary Diol>

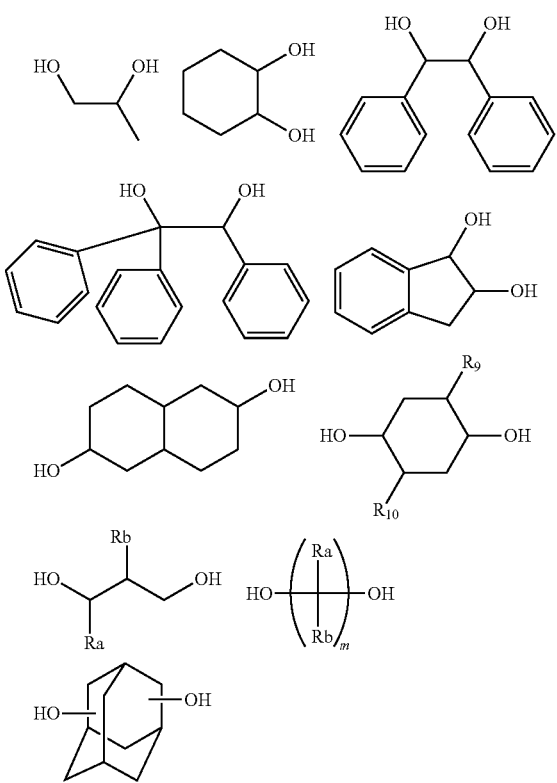

More specific examples of the dialcohol compounds in the present embodiment include dialcohols containing a cyclic structure, such as 1,4-cyclohexanediol, 1,4-cyclohexanedimethanol, 1,6-cyclohexanedimethanol, tricyclo[5.2.1.0$^{2,6}$]decanedimethanol, decalin-2,6-dimethanol, pentacyclopentadecanedimethanol, isosorbide, isomannide, and 1,3-adamantanedimethanol; dialcohols containing an aromatic ring, such as p-xylylene glycol, m-xylylene glycol, naphthalenedimethanol, biphenyldimethanol, 1,4-bis(2-hydroxyethoxy)phenyl, 4,4'-bis(2-hydroxyethoxy)biphenyl, 2,2'-bis[(2-hydroxyethoxy)phenyl]propane, 9,9-bis[4-(2-hydroxyethoxy)phenyl]fluorene (BPEF), 9,9-bis(hydroxymethyl)fluorene, 9,9-bis(hydroxyethyl)fluorene, fluorene glycol, and fluorenediethanol; aliphatic polyester diols, such as polycaprolactone diol, poly(1,4-butanediol adipate) diol, and poly(1,4-butanediol succinate) diol; branched aliphatic dialcohols, such as 2-butyl-2-ethylpropane-1,3-diol (2-butyl-2-ethyl-1,3-propane glycol; BEPG), 2,2-diethylpropane-1,3-diol, 2,2-diisobutylpropane-1,3-diol, 2-ethyl-2-methylpropane-1,3-diol, 2-methyl-2-propylpropanediol, 2-methylpropane-1,3-diol, and propane-1,2-diol; and carbonate diol compounds, such as bis(3-hydroxy-2,2-dimethylpropyl) carbonate, and at least one member selected from the group consisting of these compounds is preferred.

The dialcohol compounds may be used individually or in combination. With respect to the dialcohol compound actually used, the type of a preferred compound may vary depending on, for example, the reaction conditions, and can be appropriately selected according to, for example, the employed reaction conditions.

With respect to the upper limit of the boiling point of the dialcohol compound, there is no particular limitation. For example, the upper limit of the boiling point is 500° C. or lower. In the process according to the present embodiment, even when the dialcohol compound has a relatively low boiling point, it is possible to cause the dialcohol compound to efficiently participate in the interconnecting and molecular-weight increasing reaction. Therefore, a further preferred dialcohol compound has a boiling point as relatively low as 350° C. or lower. The conversion (immobilization ratio) means a ratio of the dialcohol compound, which is reacted with the aromatic polycarbonate prepolymer in the third step to interconnect the molecules of the prepolymer so as to increase the molecular weight of the prepolymer, to the added dialcohol compound.

With respect to the lower limit of the boiling point of the dialcohol compound, there is no particular limitation. Taking into consideration distilling off the aromatic monohydroxy compound by-produced in the reaction of the aromatic polycarbonate prepolymer and the dialcohol compound, the dialcohol compound preferably has a boiling point higher than that of the aromatic monohydroxy compound. Further, it is preferred that the lower limit of the boiling point of the dialcohol compound is selected taking into consideration a need to surely advance the reaction without volatilizing the dialcohol compound at a predetermined temperature and under a predetermined pressure.

Specific more preferred examples of the dialcohol compounds include 1,4-cyclohexanedimethanol, 1,6-cyclohexanedimethanol (boiling point: 283° C.), decalin-2,6-dimethanol (341° C.), pentacyclopentadecalindimethanol, 4,4'-bis(2-hydroxyethoxy)biphenyl, 2,2'-bis[(2-hydroxyethoxy)phenyl]propane, 9,9-bis[4-(2-hydroxyethoxy)phenyl]fluorene (BPEF), 9,9-bis(hydroxymethyl)fluorene, 9,9-bis(hydroxyethyl)fluorene, fluorene glycol, fluorenediethanol, 2-butyl-2-ethylpropane-1,3-diol (271° C.), 2,2-diethylpropane-1,3-diol (250° C.), 2,2-diisobutylpropane-1,3-diol (280° C.), 2-ethyl-2-methylpropane-1,3-diol (226° C.), 2-methyl-2-propylpropane-1,3-diol (230° C.), propane-1,2-diol (188° C.), and bis(3-hydroxy-2,2-dimethylpropyl) carbonate, and at least one member selected from the group consisting of these compounds is preferred.

The dialcohol compound is preferably selected from the group consisting of pentacyclopentadecanedimethanol, 1,4-cyclohexanedimethanol, 1,3-adamantanedimethanol, decalin-2,6-dimethanol, tricyclodecanedimethanol, 2-butyl-2-ethylpropane-1,3-diol, 2,2-diisobutylpropane-1,3-diol, 2-ethyl-2-methylpropane-1,3-diol, 2,2-diethylpropane-1,3-diol, and 2-methyl-2-propylpropane-1,3-diol, and more preferred is 2-butyl-2-ethylpropane-1,3-diol.

The amount of the dialcohol compound used is preferably 0.01 to 1.0 mol, more preferably 0.1 to 1.0 mol, further preferably 0.1 to 0.5 mol, especially preferably 0.2 to 0.4 mol, per 1 mol of total amount of terminal group of the aromatic polycarbonate prepolymer.

When the amount of the dialcohol compound used is the above-mentioned upper limit or less, an occurrence of an insertion reaction in which the dialcohol compound is inserted as a copolymerizable component into the main chain of the aromatic polycarbonate resin is suppressed, so that it is likely that an adverse effect on the physical properties of the resultant resin due to an increase of the ratio of copolymerization can be suppressed. On the other hand, when the amount of the dialcohol compound used exceeds the upper limit to increase the ratio of copolymerization, the improvement of the physical properties by using the dialcohol compound can be facilitated, but such a large amount of the dialcohol compound is disadvantageous to the molecular weight increasing effect for the aromatic polycarbonate resin. Further, when the amount of the dialcohol compound used is the above-mentioned lower limit or more, the molecular weight increasing effect is advantageously increased.

With respect to the first catalyst contained in the catalyst composition, there is no particular limitation as long as the first catalyst can catalyze the interconnecting and molecular-weight increasing reaction of the aromatic polycarbonate prepolymer and the dialcohol compound. For example, as the first catalyst, a transesterification catalyst used as a catalyst for general polycarbonate production, such as a basic compound catalyst, can be used.

Examples of the basic compound catalysts include alkali metal compounds and/or alkaline earth metal compounds, and nitrogen-containing compounds.

Examples of alkali metal compounds and/or alkaline earth metal compounds include organic acid salts, inorganic salts, oxides, hydroxides, hydrides, alkoxides, and phenoxides of an alkali metal or an alkaline earth metal. Examples of nitrogen-containing compounds include quaternary ammonium hydroxides and salts thereof, and amines. These compounds can be used individually or in combination.

Specific examples of the alkali metal compounds include sodium hydroxide, potassium hydroxide, cesium hydroxide, lithium hydroxide, sodium hydrogencarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylborate, sodium tetraphenylborate, sodium benzoate, potassium benzoate, cesium benzoate, lithium benzoate, disodium hydrogenphosphate, dipotassium hydrogenphosphate, dilithium hydrogenphosphate, disodium phenylphosphate, a disodium salt, a dipotassium salt, a dicesium salt, and a dilithium salt of bisphenol A, and a sodium salt, a potassium salt, a cesium salt, and a lithium salt of phenol.

Specific examples of the alkaline earth metal compounds include magnesium hydroxide, calcium hydroxide, strontium hydroxide, barium hydroxide, magnesium hydrogencarbonate, calcium hydrogencarbonate, strontium hydrogencarbonate, barium hydrogencarbonate, magnesium carbonate, calcium carbonate, strontium carbonate, barium carbonate, magnesium acetate, calcium acetate, strontium acetate, barium acetate, magnesium stearate, calcium stearate, calcium benzoate, and magnesium phenylphosphate.

Specific examples of the nitrogen-containing compounds include quaternary ammonium hydroxides having an alkyl group and/or an aryl group, such as tetramethylammonium hydroxide, tetraethylammonium hydroxide, tetrapropylammonium hydroxide, tetrabutylammonium hydroxide, and trimethylbenzylammonium hydroxide; tertiary amines, such as triethylamine, dimethylbenzylamine, and triphenylamine; secondary amines, such as diethylamine and dibutylamine; primary amines, such as propylamine and butylamine; imidazoles, such as 2-methylimidazole, 2-phenylimidazole, and benzimidazole; and bases and basic salts, such as ammonia, tetramethylammonium borohydride, tetrabutylammonium borohydride, tetrabutylammonium tetraphenylborate, and tetraphenylammonium tetraphenylborate.

As a catalyst other than those mentioned above, a salt of a metal, such as zinc, tin, zirconium, or lead, is preferably used, and these catalysts can be used individually or in combination.

Specific examples of other catalysts include zinc acetate, zinc benzoate, zinc 2-ethylhexanoate, tin(II) chloride, tin (IV) chloride, tin(II) acetate, tin(IV) acetate, dibutyltin dilaurate, dibutyltin oxide, dibutyltin dimethoxide, zirconium acetylacetonate, zirconium oxyacetate, zirconium tetrabutoxide, lead(II) acetate, and lead(IV) acetate.

In the process according to the present embodiment, as the alkali metal compound and/or alkaline earth metal compound, at least one member selected from the group consisting of cesium carbonate ($Cs_2CO_3$), sodium hydrogencarbonate ($NaHCO_3$), sodium tetraphenylborate, disodium phenylphosphate, and potassium carbonate is preferably used. Of these, at least one of cesium carbonate and potassium carbonate is more preferred. These catalysts can be used individually or in combination.

The above catalyst is used in an amount of, for example, $1 \times 10^{-6}$ mol or less, preferably $1 \times 10^{-8}$ to $1 \times 10^{-6}$ mol, further preferably $1 \times 10^{-7}$ to $1 \times 10^{-6}$ mol, per 1 mol of the total of the aromatic dihydroxy compound constituting the aromatic polycarbonate prepolymer.

As the nitrogen-containing compound catalyst, tetramethylammonium hydroxide is preferably used. The nitrogen-containing compound catalysts can be used individually or in combination with, e.g., the above-mentioned alkali metal and/or alkaline earth metal. The nitrogen-containing compound catalyst is used in an amount of $1\times10^{-3}$ mol or less, preferably $1\times10^{-7}$ to $1\times10^{-3}$ mol, further preferably $1\times10^{-6}$ to $1\times10^{-4}$ mol, per 1 mol of the total of the aromatic dihydroxy compound constituting the aromatic polycarbonate prepolymer.

The catalyst composition obtained in the first step preferably includes at least one dialcohol compound and at least one first catalyst selected from the group consisting of alkali metal compounds and alkaline earth metal compounds, more preferably includes a dialcohol compound represented by Formula (1b) and at least one first catalyst selected from the group consisting of alkali metal compounds.

When the catalyst composition includes a dialcohol compound and at least one first catalyst selected from the group consisting of alkali metal compounds and alkaline earth metal compounds, the content of the first catalyst in the catalyst composition is preferably 0.0001 to 0.01% by mass, more preferably 0.0005 to 0.007% by mass, further preferably 0.0005 to 0.007% by mass.

The catalyst composition obtained in the first step is preferably in a liquid state when being used in the second step, and may be one which becomes in a liquid state by heating it. The viscosity of the catalyst composition when being used in the second step is preferably 0.1 to 10,000 P (poise; 0.01 to 1,000 Pa·s), more preferably 1 to 100 P (0.1 to 10 Pa·s).

Second Step

In the second step, the catalyst composition obtained in the first step is mixed with an aromatic polycarbonate prepolymer (hereinafter, frequently referred to simply as "prepolymer" or "PP") to obtain a prepolymer mixture.

By mixing the dialcohol compound and first catalyst in the form of the catalyst composition with an aromatic polycarbonate prepolymer, the generation of heterologous structures in the molecular weight increasing reaction can be effectively suppressed. Particularly, even when an alkali metal and/or alkaline earth metal compound is used as the first catalyst, the generation of heterologous structures can be effectively suppressed while satisfactorily utilizing excellent catalysis of the compound.

The ratio of the catalyst composition and the aromatic polycarbonate prepolymer mixed can be appropriately selected according to, for example, the constituents of the catalyst composition and the aromatic polycarbonate prepolymer. For example, the catalyst composition can be mixed so that the amount of the dialcohol compound becomes 0.01 to 1.0 mol, more preferably 0.1 to 1.0 mol, further preferably 0.1 to 0.5 mol, especially preferably 0.2 to 0.4 mol, per 1 mol of total amount of terminal group of the aromatic polycarbonate prepolymer.

In the second step, with respect to the method for mixing the catalyst composition and an aromatic polycarbonate prepolymer with each other to prepare a prepolymer mixture, there is no particular limitation, and the method can be appropriately selected from conventionally known methods for preparing a resin mixture. As the method for preparing a prepolymer mixture, there can be mentioned, for example, a method using an in-line mixer.

An in-line mixer is a mixer which is capable of directly mixing two or more types of fluids (gas and/or liquid) with each other within a pipe line so that the resultant mixture becomes homogeneous. Examples of such in-line mixers include a static mixer, a dynamic mixer, a planetary mixer, a spade-blade mixer, a kneader, an extruder, a two-shaft high-speed kneader, and a continuous blender.

Examples of static mixers include Sulzer Mixer, manufactured by Sulzer Ltd. (such as SMX type and SMB-H type); Static Mixer, manufactured by Tokyo Nisshin Jabara Co., Ltd. (such as WB-32A); and Static Mixer, manufactured by Noritake Co., Limited.

Examples of kneaders include KRC Kneader and KRC Reactor, each manufactured by Kurimoto, Ltd.; and NES KO Kneader, manufactured by Chemical Engineering Co., Ltd.

Examples of two-shaft high-speed kneaders include FCM type Kneader, manufactured by Farrel Corporation, USA; LCM type Kneader, manufactured by Kobe Steel Ltd.; and CIM and CPM type Kneaders, each manufactured by The Japan Steel Works, Ltd.

Examples of extruders include ZSK type Twin-screw extruder, manufactured by Werner & Pfleiderer Industrielle Backtechnik GmbH, Germany.

Examples of continuous blenders include NES KO Blender, manufactured by Chemical Engineering Co., Ltd.

In the second step, the aromatic polycarbonate prepolymer and the catalyst composition are mixed under a pressure of more than 200 torr (26.7 kPa), preferably under a pressure of 500 torr (66.7 kPa) or more, more preferably under a pressure of 700 torr (93.3 kPa) or more, further preferably under atmospheric pressure (760 torr, 0.10 MPa). When the aromatic polycarbonate prepolymer and the catalyst composition are mixed under a pressure of 200 torr (26.7 kPa) or more, it is likely that the dialcohol compound, even though having a relatively low boiling point, is prevented from volatilizing, so that the conversion (immobilization ratio) is improved.

The aromatic polycarbonate prepolymer used in the process according to the present embodiment preferably has a high end-capped terminal group content and a relatively low terminal hydroxy group concentration (preferably a terminal hydroxy group concentration of 1,500 ppm or less). When the dialcohol compound is added to such an aromatic polycarbonate prepolymer, a reaction of an end of the aromatic polycarbonate prepolymer with the dialcohol compound extremely rapidly proceeds.

The end-capped terminal group and terminal hydroxy group concentration of the aromatic polycarbonate prepolymer are described in detail later.

When a cleavage (scission) reaction causes the terminal hydroxy group concentration to be increased to too high an extent, the molecular weight of the aromatic polycarbonate prepolymer in the prepolymer mixture to be fed to the third step (molecular weight increasing step) may become too low, making it difficult to satisfactorily increase the molecular weight (or making it difficult to obtain a high molecular-weight polycarbonate). Alternatively, for obtaining a high molecular-weight aromatic polycarbonate resin having a satisfactorily increased molecular weight, there is a need to increase the reaction time (residence time) in the third step. When the reaction time (residence time) in the third step is increased, the obtained high molecular-weight aromatic polycarbonate resin may suffer a lowering of quality, for example, may suffer an increase of the N value, discoloration, or an increase of the amount of heterologous structures.

Therefore, in the process for producing a high molecular-weight aromatic polycarbonate resin, it is preferred that the aromatic polycarbonate prepolymer and the catalyst composition are mixed with each other under a pressure of more than 200 torr (26.7 kPa) to prepare a prepolymer mixture, and then, before the terminal hydroxy group concentration of the aromatic polycarbonate prepolymer in the prepolymer mixture has reached 2,000 ppm, the prepolymer mixture is subjected to interconnecting and molecular-weight increasing reaction under reduced pressure conditions in the third step.

The terminal hydroxy group concentration of the aromatic polycarbonate prepolymer in the prepolymer mixture being fed to the interconnecting and molecular-weight increasing reactor is preferably less than 1,800 ppm, more preferably less than 1,600 ppm.

More ideally, it is desired that the mixing time, mixing temperature, and other mixing conditions in the second step are set so that only one end of the dialcohol compound is reacted with the aromatic polycarbonate prepolymer. That is, the prepolymer mixture obtained in the second step contains the aromatic polycarbonate prepolymer, the dialcohol compound, the reaction product obtained from a reaction of the dialcohol compound with the aromatic polycarbonate prepolymer (more preferably the reaction product obtained from a reaction of only one end of the dialcohol compound with the aromatic polycarbonate prepolymer), and the catalyst added.

The prepolymer mixture may contain, in addition to the above-mentioned components, reaction by-products including a cyclic carbonate derived from the dialcohol compound and an aromatic monohydroxy compound, such as phenol. Further, the prepolymer mixture may contain unreacted raw material monomers.

With respect to the mixing time in the second step, there is no particular limitation as long as it is a period of time such that the above-mentioned terminal hydroxy group concentration of the aromatic polycarbonate prepolymer does not reach 2,000 ppm, and the mixing time can be appropriately selected according to other conditions for mixing (including the mixing temperature and the type of the mixer). The mixing time is preferably 7 minutes or less, more preferably 5 minutes or less, especially preferably 3 minutes or less. Specifically, in the second step, it is preferred that 7 minutes or less, preferably 5 minutes or less, especially preferably 3 minutes or less after the catalyst composition containing the dialcohol compound is added to the aromatic polycarbonate prepolymer, the obtained prepolymer mixture is fed to the interconnecting and molecular-weight increasing reactor in the third step and subjected to interconnecting and molecular-weight increasing reaction under reduced pressure conditions.

By reducing the mixing time in the second step, it is likely that a cleavage (scission) reaction of the aromatic polycarbonate prepolymer is prevented from proceeding, and thus the interconnecting and molecular-weight increasing reaction more efficiently proceeds in the third step, so that the obtained high molecular-weight aromatic polycarbonate resin is further improved in quality.

With respect to the mixing temperature in the second step, there is no particular limitation as long as the aromatic polycarbonate prepolymer and the catalyst composition can be mixed with each other. The mixing temperature in the second step is preferably 220 to 300° C., more preferably 260 to 300° C.

With respect to the weight average molecular weight of the aromatic polycarbonate prepolymer in the prepolymer mixture obtained in the second step, there is no particular limitation, and the weight average molecular weight is preferably 10,000 to 40,000, more preferably 12,000 to 35,000 (polystyrene-converted molecular weight measured by GPC).

The aromatic polycarbonate prepolymer used in the second step may be, for example, one which is obtained in the step of preparing an aromatic polycarbonate prepolymer, or one which is commercially available. It is preferred that the process for producing a high molecular-weight aromatic polycarbonate resin further includes, in addition to the first through third steps, the aromatic polycarbonate prepolymer preparation step (hereinafter, frequently referred to as "fourth step").

It is preferred that the aromatic polycarbonate prepolymer preparation step includes the step of subjecting an aromatic dihydroxy compound and a carbonate diester to polycondensation reaction in the presence of a second catalyst to obtain the aromatic polycarbonate prepolymer.

As examples of the aromatic dihydroxy compound which is a main raw material in the aromatic polycarbonate prepolymer preparation step, there can be mentioned compounds represented by the following Formula (3).

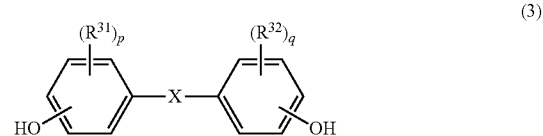

(3)

In Formula (3), each of two phenylene groups may be independently any of a p-phenylene group, a m-phenylene group, and an o-phenylene group, but both the two phenylene groups are preferably a p-phenylene group.

In Formula (3), each of $R^{31}$ and $R^{32}$ independently represents a halogen atom, a nitro group, an amino group, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxy group having 6 to 20 carbon atoms, an aryloxy group having 6 to 20 carbon atoms, or an aralkyl group having 6 to 20 carbon atoms.

Specific preferred examples of $R^{31}$'s and $R^{32}$'s include fluorine, an amino group, a methoxy group, a methyl group, a cyclohexyl group, and a phenyl group.

p and q represent an integer of 0 to 4, preferably an integer of 0 to 2. X represents a single bond or a divalent group selected from the group (3a) of linkage groups shown below. In the group (3a) of linkage groups, each of $R^{33}$ and $R^{34}$ independently represents a hydrogen atom, an alkyl group having 1 to 10 (preferably 1 to 6) carbon atoms, or an aryl group having 6 to 10 carbon atoms, or $R^{33}$ and $R^{34}$ are bonded together to form an aliphatic ring.

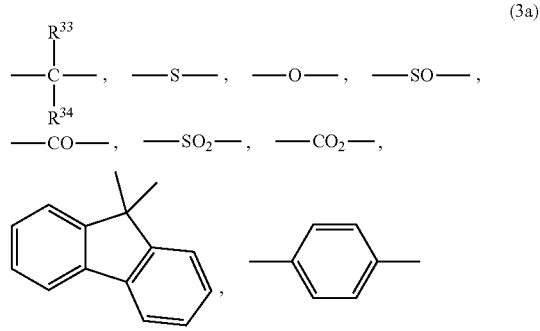

(3a)

Specific examples of the aromatic dihydroxy compounds include bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(4-hydroxy-3-isopropylphenyl)propane, 2,2-bis(4-hydroxyphenyl)butane, 2,2-bis(4-hydroxyphenyl)octane, 2,2-bis(3-tert-butyl-4-hydroxyphenyl)propane, 2,2-bis(3-bromo-4-hydroxyphenyl)propane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3-cyclohexyl-4-hydroxyphenyl) propane, 1,1-bis(3-cyclohexyl-4-hydroxyphenyl)cyclohexane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 1,1-bis(4-hydroxyphenyl)-3,3,5-trimethylcyclohexane, 4,4'-dihydroxydiphenyl ether, 4,4'-dihydroxybiphenyl, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxy-3,3'-dimethylphenyl ether, 4,4'-dihydroxyphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenyl sulfone, 4,4'-dihydroxy-3,3'-dimethyldiphenyl sulfone, 2,2'-diphenyl-4,4'-dihydroxydiphenylsulfonyl, 2,2'-dimethyl-4,4'-dihydroxydiphenylsulfonyl, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.0$^{2,6}$]decane, 4,4'-(1,3-adamantanediyl)diphenol, and 1,3-bis(4-hydroxyphenyl)-5,7-dimethyladamantane.

Of these, 2,2-bis(4-hydroxyphenyl)propane (hereinafter, frequently referred to as "bisphenol A" or "BPA") is preferred because, for example, it is stable as a monomer and further one containing less impurities is easily available. The above-mentioned aromatic dihydroxy compounds may be used in combination if necessary.

In the aromatic polycarbonate prepolymer preparation step, if necessary, an aromatic polycarbonate prepolymer containing a polyester carbonate may be prepared using the above aromatic dihydroxy compound in combination with a dicarboxylic acid compound, such as terephthalic acid, isophthalic acid, naphthalenedicarboxylic acid, or 1,4-cyclohexanedicarboxylic acid.

Further, in the aromatic polycarbonate prepolymer preparation step, a polyfunctional compound having per molecule 3 or more functional groups, preferably 3 to 6 functional groups can be used in combination with the aromatic dihydroxy compound. As such a polyfunctional compound, a compound having, e.g., a phenolic hydroxy group or a carboxyl group is preferably used, and 1,1,1-tris(4-hydroxyphenyl)ethane is especially preferably used.

As examples of the carbonate diester in the aromatic polycarbonate prepolymer preparation step, there can be mentioned compounds represented by the following Formula (4).

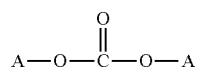

(4)

In Formula (4), A each occurrence independently represents a linear, branched, or cyclic monovalent hydrocarbon group having 1 to 10 carbon atoms and being optionally substituted. Two A's may be different from each other. Especially, A is preferably an aromatic hydrocarbon group optionally having a substituent.

Specific examples of the carbonate diesters include aromatic carbonate diesters, such as diphenyl carbonate, ditolyl carbonate, bis(2-chlorophenyl) carbonate, m-cresyl carbonate, dinaphthyl carbonate, and bis(4-phenylphenyl) carbonate. In addition, for example, dimethyl carbonate, diethyl carbonate, dibutyl carbonate, or dicyclohexyl carbonate can be used if desired. Of these, diphenyl carbonate is preferred from the viewpoint of the reactivity, the stability to discoloration of the obtained resin, and further the cost.

In the aromatic polycarbonate prepolymer preparation step, for introducing an end-capped terminal group into the aromatic polycarbonate prepolymer, it is preferred to use the carbonate diester in an excess amount relative to the aromatic dihydroxy compound. More preferably, the ratio of the charged carbonate diester to the charged aromatic dihydroxy compound (carbonate diester/aromatic dihydroxy compound) is 1.0 to 1.3 (molar ratio). That is, the carbonate diester is preferably used in an amount of 1.0 to 1.3 mol, further preferably 1.02 to 1.20 mol, especially preferably 1.02 to 1.15 mol, per 1 mol of the total of the aromatic dihydroxy compound.

The polycondensation reaction of the aromatic dihydroxy compound and carbonate diester in the aromatic polycarbonate prepolymer preparation step is conducted in the presence of a second catalyst. As the second catalyst, a transesterification catalyst used as a catalyst for general polycarbonate production, such as a basic compound catalyst, can be used. Details of the second catalyst are the same as those of the first catalyst used in the first step.

The second catalyst is preferably at least one member selected from the group consisting of alkali metal compounds and alkaline earth metal compounds, and at least one member selected from the group consisting of cesium carbonate, sodium hydrogencarbonate, sodium tetraphenylborate, disodium phenylphosphate, and potassium carbonate is more preferably used, and at least one of cesium carbonate and potassium carbonate is further preferred. These second catalysts can be used individually or in combination.

In the aromatic polycarbonate prepolymer preparation step, the second catalyst is used in an amount of, for example, $1\times10^{-6}$ mol or less, preferably $1\times10^{-8}$ to $1\times10^{-6}$ mol, further preferably $1\times10^{-7}$ to $1\times10^{-6}$ mol, per 1 mol of the total of the aromatic dihydroxy compound.

The molar ratio of the first catalyst and second catalyst used is preferably 1:9 to 9:1, more preferably 3:7 to 8:2, further preferably 4:6 to 7:3, especially preferably 5:5 to 7:3. The above molar ratio is preferably applied when both the first catalyst and the second catalyst are at least one member selected from the group consisting of alkali metal compounds and alkaline earth metal compounds.

Further, the total amount of the first catalyst and second catalyst used is, for example, $1\times10^{-6}$ mol or less, preferably $1\times10^{-8}$ to $1\times10^{-6}$ mol, further preferably $1\times10^{-7}$ to $1\times10^{-6}$ mol, per 1 mol of the total of the aromatic dihydroxy compound used in the aromatic polycarbonate prepolymer preparation step.

The aromatic polycarbonate prepolymer preparation step is preferably conducted in coexistence with a cocatalyst as well as the second catalyst (preferably at least one member selected from the group consisting of alkali metal compounds and alkaline earth metal compounds). By using a cocatalyst, an aromatic polycarbonate prepolymer can be more efficiently prepared.

As a cocatalyst, a nitrogen-containing compound in a transesterification catalyst is preferably used. Details of the nitrogen-containing compound are as already mentioned above. As a cocatalyst, specifically, at least one member selected from the group consisting of quaternary ammonium hydroxides is preferably used, and at least one member selected from the group consisting of tetraalkylammonium hydroxides is more preferably used, and tetramethylammonium hydroxide is further preferably used.

The amount of the cocatalyst used is, for example, $1 \times 10^{-3}$ mol or less, preferably $1 \times 10^{-7}$ to $1 \times 10^{-3}$ mol, further preferably $1 \times 10^{-6}$ to $1 \times 10^{-4}$ mol, per 1 mol of the total of the aromatic dihydroxy compound.

In the aromatic polycarbonate prepolymer preparation step, it is preferred that the aromatic dihydroxy compound and the carbonate diester as main raw materials are subjected to polycondensation reaction in the presence of a second catalyst in a polycondensation reactor to prepare an aromatic polycarbonate prepolymer. The polycondensation reaction is a melt polycondensation reaction based on a transesterification reaction.

With respect to the polycondensation reactor used for performing the aromatic polycarbonate prepolymer preparation step, one reactor or two or more reactors are used. When two or more reactors are used, the reactors may be connected in series. As the reactor, preferably two or more reactors, more preferably 2 to 6 reactors, especially preferably 3 to 5 reactors are used and connected in series. The polycondensation reactor may be either of a vertical type or of a horizontal type, and is preferably of a vertical type.

The polycondensation reactors individually can be provided with a stirring apparatus, such as a conventionally known stirring blade. Specific examples of stirring blades include an anchor-type stirring blade, a Maxblend (R) type stirring blade, and a double-helical ribbon blade.

The reaction conditions in the polycondensation reactors are preferably individually set so that the temperature and the degree of vacuum become higher and the rate of stirring becomes lower as the polycondensation reaction proceeds. During the polycondensation reaction, it is preferred that the liquid level is controlled so that the average residence time in each reactor, for example, in the reactor before adding an interconnecting agent becomes about 30 to 120 minutes. Further, in each reactor, phenol by-produced simultaneously with the melt polycondensation reaction may be discharged from the reaction system through a distillate pipe fitted to each reactor.

In the aromatic polycarbonate prepolymer preparation step, the degree of vacuum is preferably 0.0075 to 100 torr (1 Pa to 13.3 kPa), and the inner temperature of the reactor is preferably 140 to 300° C.

With respect to the number of revolutions of the stirring blade of the reactor, there is no particular limitation, and the number of revolutions is preferably maintained at 10 to 200 rpm. It is preferred that the liquid level is kept constant so that the average residence time becomes a predetermined value while discharging phenol by-produced with the progress of the reaction and others through the distillate pipe, conducting a polycondensation reaction. With respect to the average residence time in each reactor, there is no particular limitation, and the average residence time is generally 30 to 120 minutes.

With respect to the weight average molecular weight of the aromatic polycarbonate prepolymer obtained in the aromatic polycarbonate prepolymer preparation step, there is no particular limitation, and the weight average molecular weight is preferably 10,000 to 50,000, more preferably 15,000 to 35,000 (polystyrene-converted molecular weight measured by GPC).

The aromatic polycarbonate prepolymer preferably has at least part of the terminal groups thereof capped with end-capped terminal groups. With respect to the compound constituting the end-capped terminal group, there is no particular limitation, and, for example, an aromatic monohydroxy compound can be preferably used. With respect to the proportion of the amount of end-capped terminal group included of the aromatic monohydroxy compound to the total amount of the terminal groups of the aromatic polycarbonate prepolymer, there is no particular limitation. The proportion is, for example, 60 mol % or more, preferably 80 mol % or more.

The concentration of the terminal hydroxy groups in the aromatic polycarbonate prepolymer is preferably 1,500 ppm or less, further preferably 1,000 ppm or less, further preferably 750 ppm or less, especially preferably 500 ppm or less.

When the concentration of the terminal hydroxy groups is in the above range or when the concentration of the end-capped terminal groups corresponds to the above range, it is likely that an aromatic polycarbonate resin having a satisfactorily increased molecular weight can be obtained with excellent productivity.

In the present specification, the ratio of the end-capped terminal groups relative total amount of terminal groups of the polymer (including the aromatic polycarbonate prepolymer and the high molecular-weight aromatic polycarbonate resin) and the concentration of the hydroxy groups can be determined by the $^{1}$H-NMR analysis of the polymer. A specific $^{1}$H-NMR analysis method is described in the Examples shown later. Further, the concentration of the terminal hydroxy groups in the polymer can be measured by spectrometry with respect to a Ti complex. Specifically, a method is according to the method described in Makromolekulare Chemie 88 (1965) 215-231 in which, with respect to a complex formed from a polymer and titanium tetrachloride in a methylene chloride solution, a terminal hydroxy group concentration (OH concentration) of the polymer is measured by ultraviolet-visible spectroscopy (wavelength: 546 nm). As an apparatus, for example, Hitachi U-3500 Ultraviolet-visible spectrophotometer can be used. Using a result of ultraviolet-visible spectroscopy (wavelength: 546 nm) made with respect to a complex formed from BPA having a known concentration and titanium tetrachloride as a standard, a terminal hydroxy group concentration (OH concentration) of the polymer can be determined.

For example, provided that the polycarbonate has no branches (namely, is a linear polycarbonate) and its amount is 0.5 mol, "the total amount terminal groups of the aromatic polycarbonate prepolymer" is calculated to be 1 mol.

Specific examples of the end-capped terminal groups include terminal groups derived from an aromatic monohydroxy compound, such as a phenyl group, a cresyl group, an o-tolyl group, a p-tolyl group, a p-tert-butylphenyl group, a biphenyl group, an o-methoxycarbonylphenyl group, and a p-cumylphenyl group. Of these, preferred are terminal groups derived from an aromatic monohydroxy compound having a low boiling point which is easily removed from the reaction system in the interconnecting and molecular-weight increasing reaction with a dialcohol compound, and especially preferred are, for example, a phenyl group and a p-tert-butylphenyl group.

In a melt polymerization method, when preparing an aromatic polycarbonate prepolymer, by using a carbonate diester in an excess amount relative to the aromatic dihydroxy compound, an end-capped terminal group can be introduced. Specifically, a carbonate diester is used in an amount of 1.0 to 1.3 mol, more preferably 1.02 to 1.20 mol, especially preferably 1.02 to 1.15 mol, relative to 1 mol of the aromatic dihydroxy compound, which amount varies depending on the apparatus used in the reaction and the reaction conditions. Thus, an aromatic polycarbonate prepolymer which satisfies the above end-capped terminal amount is obtained.

Third Step (Molecular Weight Increasing Step)

In the third step, the prepolymer mixture is subjected to heating treatment under reduced pressure conditions to increase the molecular weight of the prepolymer, producing a high molecular-weight aromatic polycarbonate resin.

The third step is preferably conducted in an interconnecting and molecular-weight increasing reactor which is connected in series to the mixer in the second step. With respect to the interconnecting and molecular-weight increasing reactor used in the third step, one reactor or two or more reactors can be used, and preferred is one reactor (a single reactor).

The reduced pressure conditions in the third step are, for example, 10 torr (1.33 kPa) or less, preferably 2.0 torr or less (267 Pa or less), more preferably 0.01 to 1.5 torr (1.3 to 200 Pa), further preferably 0.01 to 1.0 torr (1.3 to 133 Pa).

The temperature conditions for the heating treatment in the third step are, for example, 240 to 320° C., preferably 260 to 310° C., more preferably 280 to 310° C.

In the third step, the oxygen concentration in the interconnecting and molecular-weight increasing reactor is preferably 0.0001 to 10 vol %, more preferably 0.0001 to 5 vol %. When the oxygen concentration is in the above range, oxidative deterioration of the dialcohol compound can be effectively suppressed. For obtaining the above oxygen concentration conditions, the gas in the reactor is preferably replaced by a gas (preferably an inert gas, such as nitrogen or argon) having an oxygen concentration of 10 vol % or less and further subjected to devolatilization.

With respect to the interconnecting and molecular-weight increasing reactor used in the third step, a horizontal stirring reactor is used. Preferred is a single-shaft horizontal stirring reactor having one stirring shaft or a multi-shaft horizontal stirring reactor having a plurality of stirring shafts, wherein at least one of the stirring shafts has a horizontal rotating shaft and a stirring blade which is fitted at almost right angle to the horizontal rotating shaft and is discontinued to the horizontal rotating shaft, wherein L/D is 1 to 15, preferably 2 to 10 wherein L is the length of the horizontal rotating shaft, and D is the turning diameter of the stirring blade. Of the above reactors, more preferred is a multi-shaft horizontal stirring reactor having a plurality of stirring shafts.

Alternatively, there can be used a single-shaft horizontal stirring reactor having one stirring shaft of a continuous screw type or a multi-shaft horizontal stirring reactor having a plurality of stirring shafts of a continuous screw type, wherein L/D is 20 to 100, more preferably 40 to 80 wherein L is the length of the stirring shaft, and D is the screw diameter, for example, an extruder can be used. Of the above reactors, more preferred is a multi-shaft horizontal stirring reactor having a plurality of stirring shafts.

These horizontal stirring reactors preferably individually have a feed inlet for the prepolymer mixture and a withdrawal outlet for the formed high molecular-weight polycarbonate resin on the other side of the feed inlet.

The interconnecting and molecular-weight increasing reactor can be provided with a stirring apparatus, such as a conventionally known stirring blade. Specific examples of stirring blades include a stirring blade of a two-shaft type, a paddle blade, a lattice blade, a spectacle-shaped blade, and an extruder type blade having a screw.

Further, the interconnecting and molecular-weight increasing reactor can be provided with a withdrawal apparatus. The high molecular-weight polycarbonate resin (polycarbonate copolymer) obtained in the interconnecting and molecular-weight increasing reactor is a resin having a high viscosity such that the fluidity is about 2,500 Pa·s at 280° C. (or the melt mass flow rate according to ISO 1133 is about 5.3 g/10 minutes), and may be difficult to withdraw from the interconnecting and molecular-weight increasing reactor, and therefore it is preferred to use a withdrawal apparatus. Specific examples of withdrawal apparatuses include a gear pump and a screw extractor, and a screw extractor is preferably used.

Further, the reactors individually can be provided with, for example, a distillate pipe for discharging by-products formed by the reaction and others, a condensing device, such as a condenser or a dry-ice trap, a receiver, such as a recovery tank, and a pressure reducing apparatus for maintaining a predetermined reduced pressure state.

The horizontal stirring reactor preferably has a withdrawal apparatus for the obtained polycarbonate resin on the other side of the feed inlet for the prepolymer mixture. As a withdrawal apparatus, a gear pump or a screw extractor is preferred, and a screw extractor is especially preferably used.

Further, as shaft sealing for the rotating shaft, a sealing mechanism including a mechanical seal is preferably employed.

With respect to the surface renewing performance of the interconnecting and molecular-weight increasing reactor used in the third step for efficiently removing the by-produced aromatic monohydroxy compound, there is no particular limitation, and the surface renewing effect represented by Equation (II) below is preferably in the range of from 0.01 to 500, further preferably 0.01 to 100, especially preferably 0.01 to 50.

$$\text{Surface renewing effect} = A \times Re^{0.5} \times n \div V \quad \text{(II)}$$

A: Surface area ($m^2$)
n: Number of revolutions/s
V: Liquid volume ($m^3$)
Re (Reynolds number): $Re = \rho \times n \times r^2 \div \mu$
$\rho$: Liquid density ($kg/m^3$)
r: Diameter of the stirrer (m)
$\mu$: Liquid viscosity (kg/m·s)

With respect to the material for the reactor used in the process for producing a high molecular-weight aromatic polycarbonate resin, in a region occupying at least 90% of the total surface area of a portion of the reactor in contact with the raw material monomer or reaction mixture (hereinafter, this portion is referred to as "liquid contact portion"), the material for the reactor is preferably at least one member selected from the group consisting of (a) a metal having an iron content of 20% by mass or less, (b) stainless steel containing 1% by mass or more of a metal selected from the group consisting of Mo, Ti, Zr, and Nb, and (c) glass. When the material is glass, further preferred is glass such that when immersed in pure water at 50° C. for 120 hours, the amount of alkali metals dissolved in water is 15 ppb/$cm^2$ or less.

The liquid contact portions of all the reactors used in the process for producing a high molecular-weight aromatic polycarbonate resin are most preferably included of the above-mentioned material, but the liquid contact portions of all the reactors are not necessarily included of the above material, and at least the liquid contact portion of the interconnecting and molecular-weight increasing reactor used in the third step is preferably included of the above material.

In the reactor used in the process for producing a high molecular-weight aromatic polycarbonate resin, a region occupying at least 90% of the total surface area of the liquid contact portion of the reactor is preferably electropolished.

The liquid contact portions of all the reactors used in the process for producing a high molecular-weight aromatic polycarbonate resin are most preferably electropolished, but the liquid contact portions of all the reactors are not necessarily electropolished, and at least the liquid contact portion of the interconnecting and molecular-weight increasing reactor used in the third step is preferably electropolished.

Specific examples of the above-mentioned preferred reactors are shown below, but they should not be construed as limiting the scope of the present invention.

1) As specific examples of multi-shaft horizontal stirring reactors having a plurality of stirring shafts, wherein at least one of the stirring shafts has a horizontal rotating shaft and a stirring blade which is fitted at almost right angle to the horizontal rotating shaft and is discontinued to the horizontal rotating shaft, wherein L/D is 1 to 15 wherein L is the length of the horizontal rotating shaft, and D is the turning diameter of the stirring blade, there can be mentioned Spectacle-shaped blade polymerizer (manufactured by Hitachi, Ltd.), Continuous LIST Kneader Reactor (manufactured by LIST AG), AP-Reactor (manufactured by LIST AG), SCR (manufactured by Mitsubishi Heavy Industries, Ltd.), and KRC Reactor (manufactured by Kurimoto, Ltd.).

2) As a specific example of a single-shaft horizontal stirring reactor having one stirring shaft, wherein the stirring shaft has a horizontal rotating shaft and a stirring blade which is fitted at almost right angle to the horizontal rotating shaft and is discontinued to the horizontal rotating shaft, wherein L/D is 1 to 15 wherein L is the length of the horizontal rotating shaft, and D is the turning diameter of the stirring blade, there can be mentioned Continuous LIST Kneader Reactor (manufactured by LIST AG).

3) As specific examples of multi-shaft horizontal stirring reactors having a plurality of stirring shafts of a continuous screw type, wherein L/D is 20 to 100 wherein L is the length of the stirring shaft, and D is the screw diameter, there can be mentioned Twin-screw extruder TEX series (manufactured by The Japan Steel Works, Ltd.), Twin-screw extruder TEM series (manufactured by Toshiba Machine Co., Ltd.), and ZSK type Twin-screw extruder (manufactured by Werner & Pfleiderer Industrielle Backtechnik GmbH).

4) As a specific example of a single-shaft horizontal stirring reactor having one stirring shaft of a continuous screw type, wherein L/D is 20 to 100 wherein L is the length of the stirring shaft, and D is the screw diameter, there can be mentioned Buss Co-kneader (manufactured by Buss Inc.).

It is preferred that the process for producing a high molecular-weight aromatic polycarbonate resin further includes a cyclic carbonate removal step of removing at least part of a cyclic carbonate formed in the molecular weight increasing step (third step) to the outside of the reaction system, and it is more preferred that the cyclic carbonate removal step includes a step of removing a distillate containing at least part of a cyclic carbonate formed in the molecular weight increasing step to the outside of the reaction system.

Specifically, in the molecular weight increasing step (third step), the molecules of the aromatic polycarbonate prepolymer are interconnected using the dialcohol compound as an interconnecting agent so as to increase the molecular weight of the prepolymer while removing at least part of a cyclic carbonate by-produced in the reaction to the outside of the reaction system, so that the molecular weight increasing reaction of the aromatic polycarbonate prepolymer further efficiently proceeds.

The molecular weight increasing step (third step) and the cyclic carbonate removal step can be physically and temporally separate steps, but can be conducted simultaneously, and are preferably simultaneously conducted.

The by-produced cyclic carbonate is preferably a compound having a structure represented by the following Formula (2a).

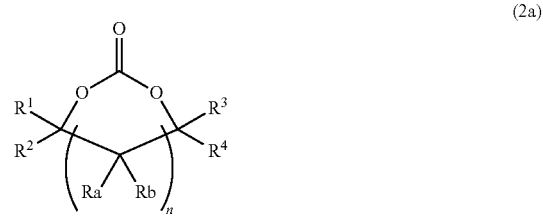

(2a)

In Formula (2a), Ra and Rb each independently represent a hydrogen atom, a halogen atom, a linear or branched alkyl group having 1 to 30 carbon atoms and optionally including an oxygen atom or a halogen atom, a cycloalkyl group having 3 to 30 carbon atoms and optionally including an oxygen atom or a halogen atom, an aryl group having 6 to 30 carbon atoms and optionally including an oxygen atom or a halogen atom, or an alkoxy group having 1 to 15 carbon atoms and optionally including an oxygen atom or a halogen atom, and Ra and Rb are optionally bonded to each other to form a ring. A preferred halogen atom is a fluorine atom.

$R^1$ to $R^4$ each independently represent a hydrogen atom, a halogen atom, or a linear or branched alkyl group having 1 to 5 carbon atoms. A preferred halogen atom is a fluorine atom.

The letter n represents an integer of 0 to 30, preferably 1 to 6, more preferably 1 to 3, especially preferably 1.

In Formula (2a), Ra and Rb each independently preferably represent a hydrogen atom, a halogen atom, a linear or branched alkyl group having 1 to 8 carbon atoms, a cycloalkyl group having 3 to 8 carbon atoms, an aryl group having 6 to 10 carbon atoms, or an alkoxy group having 1 to 8 carbon atoms, and Ra and Rb are optionally bonded to each other to form an alicyclic ring having 3 to 8 carbon atoms. A preferred halogen atom is a fluorine atom.

$R^1$ to $R^4$ each independently preferably represent a hydrogen atom, a fluorine atom, or a methyl group.

The letter n preferably represents an integer of 1 to 6.

Ra and Rb in Formula (2a) are each independently more preferably a hydrogen atom or a linear or branched alkyl group with 1 to 5 carbon atoms, further preferably a linear or branched alkyl group with 1 to 4 carbon atoms. Specific especially preferred examples include a methyl group, an ethyl group, a propyl group, a n-butyl group, and an isobutyl group. Each of $R_1$ to $R_4$ is more preferably a hydrogen atom. The letter n more preferably represents an integer of 1 to 3.

The cyclic carbonate represented by Formula (2a) above is more preferably a compound represented by Formula (2b) below. Ra and Rb in Formula (2b) are respectively the same as those described above in Formula (2a).

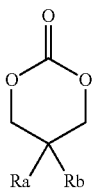
(2b)

As specific examples of the above cyclic carbonates, there can be mentioned compounds having the structures shown below.

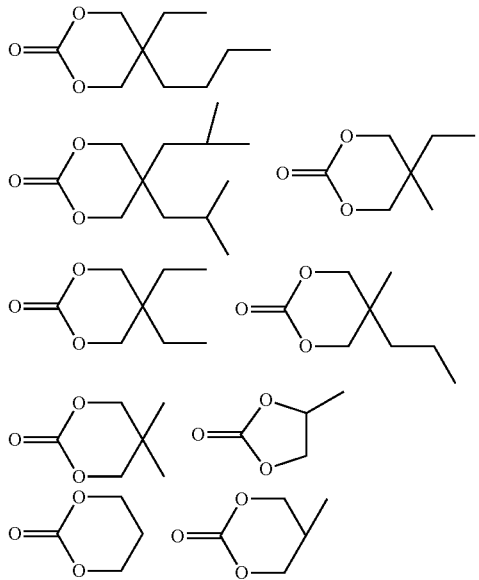

The process according to the present embodiment using the dialcohol compound having a structure represented by Formula (1) has an advantage in that the process can increase the molecular weight at a high rate, as compared to a process for producing a polycarbonate by a conventional melt polymerization method.

On the other hand, in the process according to the present embodiment, a cyclic carbonate having a specific structure may be by-produced with the progress of the molecular weight increasing reaction (third step). After the by-produced cyclic carbonate is removed to the outside of the reaction system, a high molecular-weight polycarbonate resin having substantially the same skeleton as a homopolycarbonate resin is obtained. The by-produced cyclic carbonate has a structure corresponding to the structure of the dialcohol compound used in the molecular weight increasing step and is considered to be a cyclic by-product derived from the dialcohol compound. However, the reaction mechanisms of the occurrence of such a cyclic carbonate by-product with the progress of the molecular weight increasing reaction have not yet been elucidated.

Some examples of the possible mechanisms are illustrated in the following Schemes (1) and (2), but it is not necessarily clear that the mechanism is as such. The production process using the dialcohol compound having a structure represented by Formula (1) above is such that the dialcohol compound as an interconnecting agent is reacted with the aromatic polycarbonate prepolymer to interconnect the molecules of the aromatic polycarbonate prepolymer so as to increase the molecular weight of the prepolymer while removing the by-produced cyclic carbonate having a structure corresponding to the structure of the dialcohol compound. The process using the dialcohol compound is not limited to any specific reaction mechanism as long as the reaction occurs in the above manner.

Scheme (1):

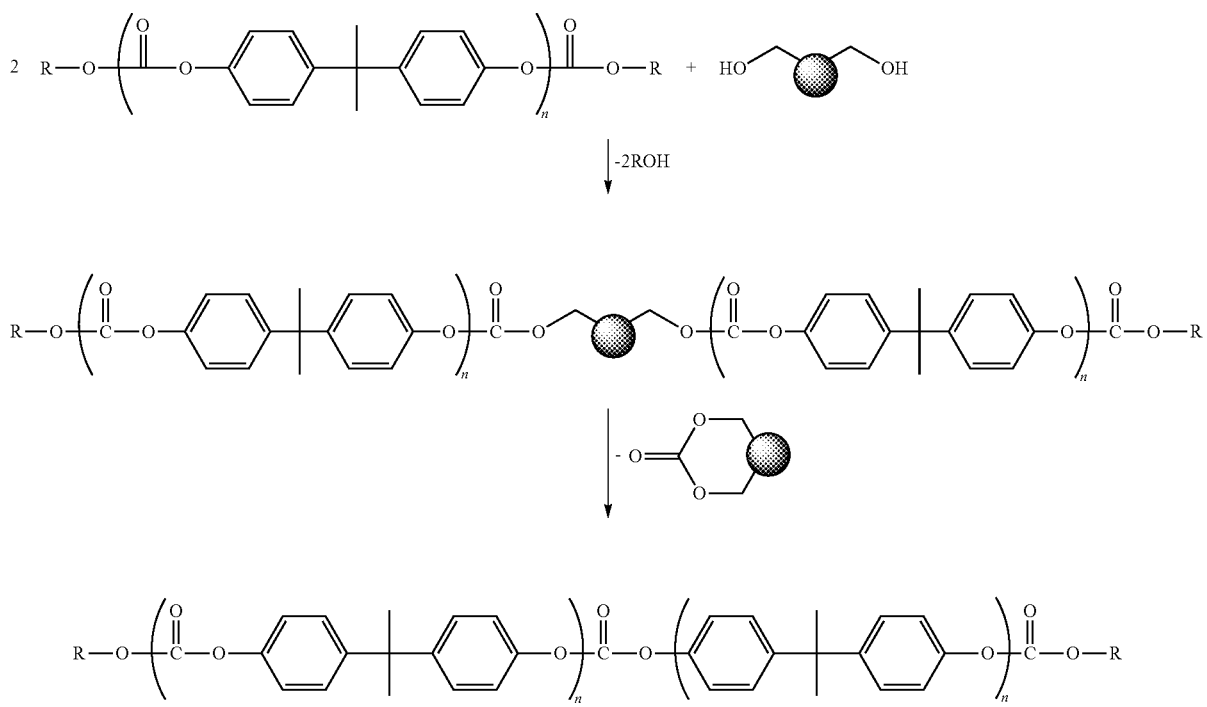

Scheme (2):

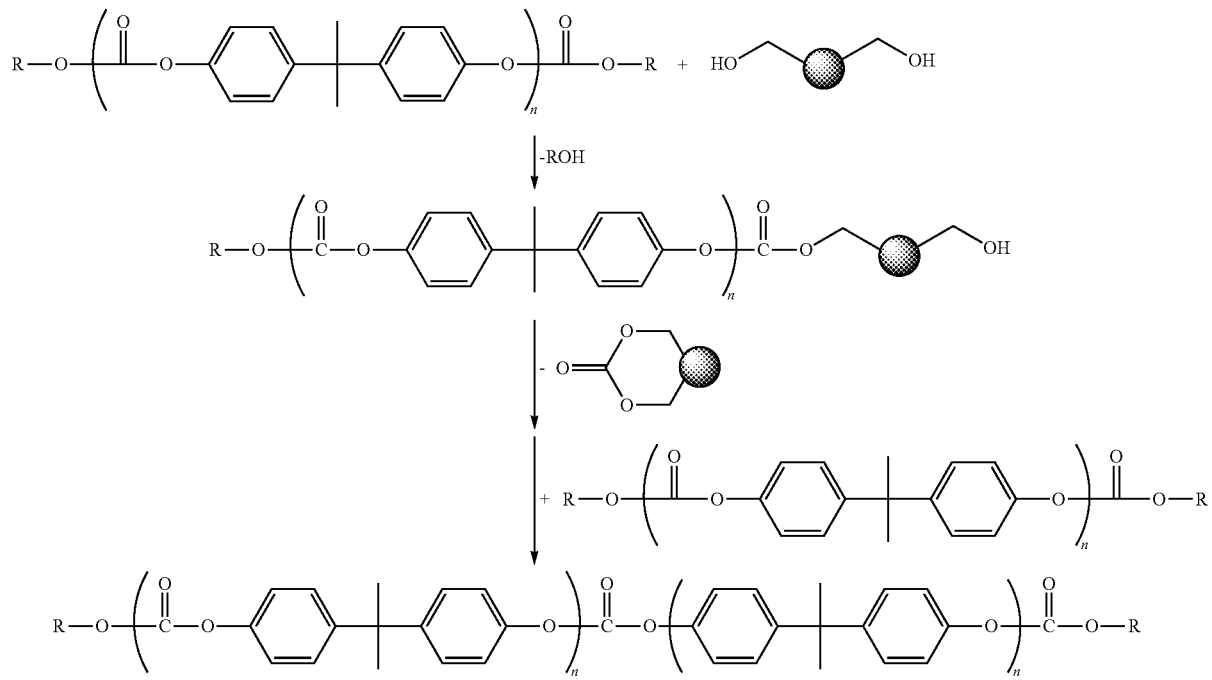

The aromatic polycarbonate resin having an increased molecular weight obtained by the production using the dialcohol compound having a structure represented by Formula (1) has almost no structural units derived from the dialcohol compound, and the skeleton of the resin is substantially the same as a homopolycarbonate resin.

That is, the resin exhibits superior thermal stability and excellent heat resistance because the skeleton is free from or contains an extremely small amount of the structural units derived from the dialcohol compound as the interconnecting agent. While having a skeleton similar to a conventional homopolycarbonate resin, the resin can achieve excellent qualities such as a low N value, a small content of units having a heterologous structure, and an excellent color tone.

In the case where the skeleton of the aromatic polycarbonate resin having an increased molecular weight obtained by the process for producing a high molecular-weight aromatic polycarbonate resin contains structural units derived from the dialcohol compound, the ratio of the structural units derived from the dialcohol compound is 1 mol % or less, more preferably 0.1 mol % or less, relative to all the structural units in the aromatic polycarbonate resin having an increased molecular weight.

As a method for removing the by-produced cyclic carbonate to the outside of the reaction system, specifically, there can be mentioned a method of distilling off a distillate formed in the molecular weight increasing step to the outside of the reaction system. More specifically, the by-produced cyclic carbonate is removed in such a manner that the reaction system is heated to distill off a distillate containing the cyclic carbonate as well as other by-products, for example, aromatic monohydroxy compounds, such as phenol, and also the unreacted raw material compounds (such as a dialcohol compound and a carbonate diester). With respect to the distilling off conditions, there is no particular limitation, and the temperature in the reactor for distilling off the distillate from the reaction system is preferably 240 to 320° C., more preferably 260 to 310° C., further preferably 280 to 310° C.

At least part of the by-produced cyclic carbonate is removed. The perfect removal of the by-produced cyclic carbonate is most preferable but is generally difficult. It is acceptable that the removal is imperfect and the resultant aromatic polycarbonate resin product contains the residual cyclic carbonate. The upper limit of the amount of the residual cyclic carbonate in the product is preferably 3,000 ppm, more preferably 1,000 ppm, further preferably 500 ppm, especially preferably 300 ppm.

One of the characteristic features of the process according to the present embodiment resides in that the increase of the molecular weight can be achieved in a short time after the start of the third step.

More specifically, in the process according to the present embodiment, the relationship between the weight average molecular weight ($Mw_{PP}$) of the aromatic polycarbonate prepolymer and the weight average molecular weight (Mw) of the high molecular-weight aromatic polycarbonate resin obtained in the third step can be represented by Equation (IV) shown below. In Equation (IV) below, k' (unit: Mw increase/minute) is the number of 400 or more.

$$(Mw-Mw_{PP})/\text{Heating time (minute)}=k' \qquad \text{(IV)}$$

In the process according to the present embodiment, the number k' in Equation (IV) above can be 400 or more, preferably 500 or more. That is, the molecular weight can be increased in a short time after the start of the reaction in the third step to efficiently achieve a predetermined high molecular weight.

The weight average molecular weight (Mw) of the high molecular-weight aromatic polycarbonate resin obtained by the process according to the present embodiment is preferably 35,000 to 100,000, more preferably 35,000 to 80,000, especially preferably 40,000 to 75,000.

The polycarbonate resin having a high molecular weight has a high melt tension so that drawdown is unlikely to occur, and therefore such a polycarbonate resin is advantageously used in applications, such as blow molding and extrusion. Further, when used in injection molding, the polycarbonate resin causes no stringing or the like and thus exhibits excellent moldability. Furthermore, the molded article obtained from the polycarbonate resin is excellent in physical properties including mechanical properties, a heat resistance, and a resistance to organic solvents.

In the high molecular-weight aromatic polycarbonate resin obtained by the process according to the present embodiment, the N value (the structural viscosity index) represented by the following Equation (I) is preferably 1.30 or less, more preferably 1.28 or less, further preferably 1.25 or less, especially preferably 1.22 or less.

$$N \text{ value} = (\log(Q160) - \log(Q10))/(\log 160 - \log 10) \quad (1)$$

In Equation (I), Q160 is the melt flow volume per unit time (ml/sec) at 280° C. and 160 kg load (measured with CFT-500D manufactured by Shimadzu Corporation (the same applies hereinbelow) and calculated with respect to strokes of 7.0 to 10.0 mm), and Q10 is the melt flow volume per unit time (ml/sec) at 280° C. and 10 kg load (calculated with respect to strokes of 7.0 to 10.0 mm). The nozzle diameter is 1 mm, and the nozzle length is 10 mm.

The structural viscosity index "N value" is an indicator of the degree of branching of aromatic polycarbonate resins. The high molecular-weight aromatic polycarbonate resin obtained by the process according to the present embodiment has a low N value. That is, the proportion of branched structures is low and the proportion of linear structures is high. In general, aromatic polycarbonate resins tend to show higher fluidity (a higher value of Q) with increasing proportion of branched structures provided that the molecular weights Mw are the same. In contrast, the high molecular-weight aromatic polycarbonate resin obtained by the continuous production process according to the present embodiment achieves high fluidity (a high value of Q) while the N value is low.

The high molecular-weight aromatic polycarbonate resin obtained by the process according to the present embodiment has good hue.

The hue of aromatic polycarbonate resins is generally evaluated based on YI values. Usually, the YI values of aromatic polycarbonate resins obtained by an interfacial polymerization method are 0.8 to 1.0. On the other hand, aromatic polycarbonates having an increased molecular weight obtained by a melt polymerization method have YI values of 1.7 to 2.0 because of the decrease in quality associated with production steps. In contrast, the high molecular-weight aromatic polycarbonate resin obtained by the process according to the present embodiment has a similar YI value to the aromatic polycarbonates obtained by an interfacial polymerization method. That is, no decrease in hue is encountered.

The high molecular-weight aromatic polycarbonate resin obtained by the process according to the present embodiment has excellent quality such that the content of the structural units having a heterologous structure is small. The structural units having a heterologous structure are structural units having a structure that could adversely affect the resin, and examples of such units can include branching structural units which are contained in a large amount in a polycarbonate obtained by a conventional melt polymerization method. The structural units having a heterologous structure can be either present as repeating structures or present randomly in the skeleton of a polycarbonate resin.

The amount of the heterologous structures in all the structural units of the aromatic polycarbonate resin, in terms of the below-mentioned PSA, is preferably 1,000 ppm or less, more preferably 800 ppm or less.

With respect to the concentration of the terminal hydroxy groups contained in the high molecular-weight aromatic polycarbonate resin obtained by the process according to the present embodiment, there is no particular limitation, and the terminal hydroxy group concentration is appropriately selected according to, e.g., the purpose. The terminal hydroxy group concentration is, for example, 1,000 ppm or less, preferably 600 ppm or less.

The process for producing a high molecular-weight aromatic polycarbonate resin can include the step of adding a catalyst deactivator to the aromatic polycarbonate resin having an increased molecular weight. It is generally preferable to deactivate the catalyst by the addition of a known acidic substance. Specific examples of such substances (catalyst deactivators) include aromatic sulfonic acids, such as paratoluenesulfonic acid; aromatic sulfonate esters, such as butyl paratoluenesulfonate; aromatic sulfonate salts, such as tetrabutylphosphonium dodecylbenzenesulfonate and tetrabutylammonium paratoluenesulfonate; organic halides, such as stearyl chloride, butyryl chloride, benzoyl chloride, toluenesulfonyl chloride, and benzyl chloride; alkylsulfate salts, such as dimethylsulfate; phosphoric acids; and phosphorous acids.

Of these, the catalyst deactivator is preferably selected from the group consisting of paratoluenesulfonic acid, butyl paratoluenesulfonate, tetrabutylphosphonium dodecylbenzenesulfonate, and tetrabutylammonium paratoluenesulfonate.

The catalyst deactivator may be admixed with the polycarbonate resin by a known method after the completion of the molecular weight increasing reaction. For example, a method may be adopted in which the deactivator is mixed and dispersed with a high-speed mixer, such as a tumbling mixer, a Henschel mixer, a ribbon blender, or a super mixer, and thereafter the mixture is melt kneaded with an extruder, a Banbury mixer, rolls or the like.

After the deactivation of the catalyst, a step of removing low boiling-point compounds in the high molecular-weight aromatic polycarbonate resin by devolatilization at a temperature of 200 to 350° C. under a pressure of 0.013 to 0.13 kPa (0.1 to 1 torr) may be performed. To perform this step, it is preferable to use a horizontal apparatus equipped with a stirring blade capable of excellent surface renewing performance, such as a paddle blade, a lattice blade, or a spectacle-shaped blade, or to use a thin-film evaporator.

A preferred apparatus is a twin-screw extruder or a horizontal reactor having a polymer seal and a vent structure.

The process for producing a high molecular-weight aromatic polycarbonate resin can further include the step of adding an additive, such as a heat stabilizer, a hydrolysis stabilizer, an antioxidant, a pigment, a dye, a reinforcing agent, a filler, an UV absorber, a lubricant, a mold release agent, a nucleating agent, a plasticizer, a fluidity improver, or an antistatic agent.

Examples of the heat stabilizers include known agents, such as triphenylphosphine (P-Ph$_3$).

Examples of the antioxidants include tris(2,4-di-tert-butylphenyl) phosphite, n-octadecyl-β-(4'-hydroxy-3',5'-di-tert-butylphenyl) propionate, pentaerythrityl-tetrakis[3-(3,5-di-tert-butyl-4-hydroxyphenyl) propionate], n-octadecyl-β-

(4'-hydroxy-3',5'-di-tert-butylphenyl) propionate, 1,6-hexanediolbis[3-(3,5-di-tert-butyl-4-hydroxyphenyl) propionate, triethylene glycol-bis-3-(3-tert-butyl-4-hydroxy-5-methylphenyl) propionate, 3,9-bis[2-{3-(3-tert-butyl-4-hydroxy-5-methylphenyl)propionyloxy}-1,1-dimethylethyl]-2,4,8,10-tetraoxaspiro[5.5]undecane, triphenyl phosphite, trisnonylphenyl phosphite, tris-(2,4-di-tert-butylphenyl) phosphite, tetrakis(2,4-di-tert-butylphenyl)-4,4'-biphenylene diphosphonite, tricresyl phosphite, and 2,2-methylenebis(4,6-di-tert-butylphenyl)octyl phosphite. Of these, preferred compounds are tris(2,4-di-tert-butylphenyl) phosphite and n-octadecyl-β-(4'-hydroxy-3',5'-di-tert-butylphenyl) propionate.

The additives may be admixed with the polycarbonate resin by a known method similarly to the catalyst deactivator. For example, a method is appropriately selected in which the components are mixed and dispersed with a high-speed mixer, such as a tumbling mixer, a Henschel mixer, a ribbon blender, or a super mixer, and thereafter the mixture is melt kneaded with an extruder, a Banbury mixer, rolls or the like. The step of adding the additive may be performed simultaneously with or separately from the addition of the catalyst deactivator.

In the process according to the present embodiment, in which an aromatic polycarbonate prepolymer and a catalyst composition containing a dialcohol compound and a first catalyst are preliminarily mixed with each other in a mixer and then fed to an interconnecting and molecular-weight increasing reactor to cause an interconnecting and molecular-weight increasing reaction, producing a high molecular-weight aromatic polycarbonate resin, by preliminarily adding the first catalyst to the dialcohol compound, the first catalyst can be fed stably and accurately, and the amount of spontaneously generated heterologous structures inherent of a melt polymerization method can be further suppressed. As a result, a high molecular-weight polycarbonate resin having high quality such that the N value is low and the color tone is excellent and the increase of heterologous structures is markedly suppressed can be efficiently produced by a melt polymerization method.

The process for producing a high molecular-weight aromatic polycarbonate resin may be performed either in a batch-wise manner or in a continuous manner. Hereinbelow, an example of the process performed in a continuous manner is described in more detail with reference to the drawing, but should not be construed as limiting the scope of the present invention. In FIG. 1, the first step corresponds to an interconnecting agent preparation step, the second step corresponds to a step performed in mixer 6Mix, and the third step corresponds to an interconnecting polymerization step. The aromatic polycarbonate prepolymer preparation step (fourth step) corresponds to a polycondensation step.

In an example of the continuous production process shown in FIG. 1, a high molecular-weight aromatic polycarbonate resin is first produced through a main raw material preparation step in which an aromatic dihydroxy compound and a carbonate diester, which are main raw materials, are prepared; a polycondensation step in which the above raw materials in a molten state are subjected to polycondensation reaction to form an aromatic polycarbonate prepolymer {aromatic polycarbonate prepolymer preparation step (fourth step), which is, hereinafter, frequently referred to as "step A"}; a step in which a catalyst composition obtained in the interconnecting agent preparation step (first step) by mixing a dialcohol compound (interconnecting agent) with a first catalyst is added to the aromatic polycarbonate prepolymer obtained in step A to obtain a prepolymer mixture (second step, which is, hereinafter, frequently referred to as "step B"); and a step in which the prepolymer mixture obtained in step B is subjected to interconnecting and molecular-weight increasing reaction under reduced pressure conditions (third step, which is, hereinafter, frequently referred to as "step C").

Then, pellets of the high molecular-weight aromatic polycarbonate resin are formed through a step (not shown) in which the reaction is terminated and the unreacted raw materials and reaction by-products in the polymerization reaction mixture are removed by devolatilization, a step (not shown) in which a heat stabilizer, a mold release agent, a colorant or the like is added to the resin, and a step (not shown) in which the high molecular-weight aromatic polycarbonate resin is formed into pellets having a predetermined particle diameter.

The process shown in FIG. 1 employs a multi-stage reaction process, and step A and step C are performed using separate reactors. The polycondensation reactor used for performing step A and the interconnecting and molecular-weight increasing reactor (transesterification reactor) used for performing step C are connected in series through the mixer used for performing step B. The catalyst composition subjected to step B is preferably prepared by melting a dialcohol compound in another reactor and adding and mixing or dispersing a transesterification catalyst, such as an alkali metal compound and/or an alkaline earth metal compound, in the form of an aqueous solution and/or an organic solution into the molten dialcohol compound, and then subjecting the resultant mixture to dehydration treatment and/or devolatilization treatment.

The polycondensation reactor in step A may be included of either a single reactor or a plurality of reactors connected in series, and is preferably included of two or more reactors, preferably 2 to 6 reactors connected in series.

On the other hand, the interconnecting and molecular-weight increasing reactor in step C may be included of either a single reactor or a plurality of reactors connected in series, but is preferably included of one reactor (a single reactor).

The reactor for preparing the catalyst composition subjected to step B is preferably included of two or more reactors for continuously conducting the reaction.

In the main raw material preparation step, an aromatic dihydroxy compound and a carbonate diester, which are main raw materials, are prepared.

As apparatuses used in the main raw material preparation step, raw material mixing tanks (1Ra and 1Rb in FIG. 1) and a raw material feed pump (1P in FIG. 1) for feeding the prepared raw materials to the polycondensation step are provided. An aromatic dihydroxy compound and a carbonate diester, which are main raw materials, are continuously fed in a molten state to raw material mixing tanks 1Ra and 1Rb through feed inlets 1Ma and 1Mb in an atmosphere of nitrogen gas. In raw material mixing tanks 1Ra and 1Rb, the aromatic dihydroxy compound and the carbonate diester in a predetermined molar ratio {preferably carbonate diester/aromatic dihydroxy compound=1.0 to 1.3 (molar ratio)} are mixed with each other and molten in an atmosphere of nitrogen gas to prepare a molten raw material mixture. With respect to the specifications of raw material mixing tanks 1Ra and 1Rb, there is no particular limitation, and ones conventionally known can be used. For example, ones having Maxblend® type stirring blades (1Ya and 1Yb in FIG. 1) can be used.

For achieving continuous production, as shown in FIG. 1, it is preferred that two mixing tanks are used in the main raw material preparation step. By using two mixing tanks, mixing and melting can be alternately performed and switching valve 1Bp enables the resultant mixture to be continuously fed to reactor 3R.

As a polycondensation reactor for performing step A, one reactor or two or more reactors are used. When two or more reactors are used, the reactors are connected in series. Preferably two or more reactors, more preferably 2 to 6 reactors, especially preferably 3 to 5 reactors are used and connected in series. The polycondensation reactor may be either of a vertical type or of a horizontal type, and is preferably of a vertical type.

For example, in FIG. 1, as polycondensation reactors for step A, first vertical stirring reactor 3R, second vertical stirring reactor 4R, third vertical stirring reactor 5R, and fourth vertical stirring reactor 6R are provided.

The polycondensation reactors individually can be provided with a stirring apparatus, such as a conventionally known stirring blade. Specific examples of stirring blades include an anchor-type stirring blade, a Maxblend® type stirring blade, and a double-helical ribbon blade.

For example, in FIG. 1, first vertical stirring reactor 3R, second vertical stirring reactor 4R, and third vertical stirring reactor 5R are provided with Maxblend® type stirring blades 3Y, 4Y, 5Y, respectively, and fourth vertical stirring reactor 6R is provided with double-helical ribbon blade 6Y.

Further, the reactors individually can be provided with, for example, a preheater, a gear pump, a distillate pipe for discharging by-products formed by the polycondensation reaction and others, a condensing device, such as a condenser or a dry-ice trap, a receiver, such as a recovery tank, and a pressure reducing apparatus for maintaining a predetermined reduced pressure state.

All the reactors used in the process for a series of continuous productions are started to be controlled so that the inner temperatures and pressures reach those in their respective preset ranges.

In an example of the continuous production process using the production apparatus shown in FIG. 1, first, with respect to the five reactors connected in series {step A: first vertical stirring reactor 3R, second vertical stirring reactor 4R, third vertical stirring reactor 5R, fourth vertical stirring reactor 6R; step B: mixer (6Mix); step C: fifth horizontal stirring reactor 7R}, the inner temperatures and pressures are preliminarily set according to their respective reactions (melt polycondensation reaction and interconnecting and molecular-weight increasing reaction).

For example, the apparatus of FIG. 1 is provided with preheaters 3H, 4H, 5H, 6H and gear pumps 3P, 4P, 5P, 6P. The four reactors have fitted thereto respectively distillate pipes 3F, 4F, 5F, 6F. Distillate pipes 3F, 4F, 5F, 6F are respectively connected to condensers 3C, 4C, 5C, 6C, and the respective reactors are maintained in a predetermined reduced pressure state by pressure reducing apparatuses 3V, 4V, 5V, 6V.

The reaction conditions in the polycondensation reactors are individually set so that the temperature and the degree of vacuum become higher and the rate of stirring becomes lower as the polycondensation reaction proceeds. During the polycondensation reaction, the liquid level is controlled so that the average residence time in each reactor, for example, in the reactor before adding an interconnecting agent becomes about 30 to 120 minutes. Further, in each reactor, phenol by-produced simultaneously with the melt polycondensation reaction is discharged from the reaction system through distillate pipes 3F, 4F, 5F, 6F fitted to the respective reactors. In step A, the degree of vacuum is preferably 0.0075 to 100 torr (1 Pa to 13.3 kPa), and the inner temperature of the reactor is preferably 140 to 300° C.

More specifically, in the process shown in FIG. 1, step A is performed using four reactors (first to fourth vertical stirring reactors), and, generally, the temperatures and pressures of the reactors are set as shown below. Those of the mixer in step B and the interconnecting and molecular-weight increasing reactor (fifth horizontal stirring reactor) in step C, which are connected in series to the four reactors in step A, are also shown below.

(Preheater 1H) 180 to 230° C.
(First vertical stirring reactor 3R)
Inner temperature: 150 to 250° C.; Pressure: 200 torr (26.6 kPa) to atmospheric pressure;
Temperature of the heating medium: 220 to 280° C.
(Preheater 3H) 200 to 250° C.
(Second vertical stirring reactor 4R)
Inner temperature: 180 to 250° C.; Pressure: 100 torr (13.3 kPa) to 200 torr (26.6 kPa);
Temperature of the heating medium: 220 to 280° C.
(Preheater 4H) 230 to 270° C.
(Third vertical stirring reactor 5R)
Inner temperature: 220 to 270° C.; Pressure: 1 torr (133 Pa) to 100 torr (13.3 kPa);
Temperature of the heating medium: 220 to 280° C.
(Preheater 5H) 230 to 270° C.
(Fourth vertical stirring reactor 6R)
Inner temperature: 220 to 280° C.; Pressure: 0.0075 torr (1 Pa) to 1 torr (133 Pa);
Temperature of the heating medium: 220 to 300° C.
(Preheater 6H) 270 to 340° C.
(Mixer 6Mix)
Inner temperature: 220 to 300° C.; Pressure: 200 torr (26.6 kPa) to 3,700 torr (0.5 MPa);
Temperature of the heating medium: 220 to 320° C.
(Fifth horizontal stirring reactor 7R)
Inner temperature: 260 to 340° C.; Pressure: 10 torr or less (1,333 Pa or less);
Temperature of the heating medium: 260 to 340° C.

Then, after the inner temperatures and pressures of all the reactors used in the continuous process according to the present embodiment have reached those in the range of −5 to +5% of their respective preset values, the molten raw material mixture separately prepared in raw material mixing tanks 1R (1Ra and 1Rb) is continuously fed into first vertical stirring reactor 3R through raw material feed pump 1P and preheater 1H. Further, simultaneously with the start of feeding of the molten raw material mixture, the catalyst is continuously fed into first vertical stirring reactor 3R from catalyst feed inlet 1Cat in the transfer pipe for the molten raw material mixture to initiate a melt polycondensation based on a transesterification reaction.

With respect to the number of revolutions of the stirring blade of the reactor, there is no particular limitation, and the number of revolutions is preferably maintained at 200 to 10 rpm. The liquid level is kept constant so that the average residence time becomes a predetermined value while discharging phenol by-produced with the progress of the reaction through the distillate pipe, conducting a polycondensation reaction. With respect to the average residence time in each reactor, there is no particular limitation, and the average residence time is generally 30 to 120 minutes.

For example, in the production apparatus shown in FIG. 1, melt polycondensation is conducted in first vertical stirring reactor 3R in an atmosphere of nitrogen, for example, at a temperature of 200° C. under a pressure of 200 torr (27 kPa) while maintaining the number of revolutions of Maxblend® type stirring blade 3Y at 160 rpm. The liquid level is kept constant so that the average residence time becomes 60 minutes while discharging by-produced phenol through distillate pipe 3F, conducting a polycondensation reaction.

Subsequently, the polymerization reaction mixture is discharged by gear pump 3P from the bottom of first vertical stirring reactor 3R, and continuously fed successively to second vertical stirring reactor 4R through preheater 3H, and then to third vertical stirring reactor 5R through preheater 4H by gear pump 4P, and further to fourth vertical stirring reactor 6R through preheater 5H by gear pump 5P, whereupon a polycondensation reaction proceeds to form an aromatic polycarbonate prepolymer.

The aromatic polycarbonate prepolymer obtained in the polycondensation reactor {the last reactor when a plurality of reactors are used in step A} is fed to the mixer in step B. On the other hand, the catalyst composition, which is melted in the interconnecting agent preparation apparatus and has added thereto a catalyst solution and then is subjected to dehydration or devolatilization treatment under a reduced pressure, is directly fed to the mixer from the interconnecting agent feeding apparatus. The aromatic polycarbonate prepolymer and catalyst composition fed to the mixer are mixed with each other in the mixer, and the resultant prepolymer mixture is continuously fed to the interconnecting and molecular-weight increasing reactor in step C.

For example, in the production apparatus shown in FIG. 1, the prepolymer discharged from fourth vertical stirring reactor 6R is successively continuously fed by gear pump 6P to mixer 6Mix through preheater 6H.

When feeding the catalyst composition containing the first catalyst and the dialcohol compound (interconnecting agent) to the mixer in step B, the catalyst composition is preliminarily prepared in the interconnecting agent preparation tanks and then fed. For example, in the interconnecting agent preparation apparatuses (2Ra, 2Rb), the dialcohol compound is melted into a liquid state. In this instance, the viscosity of the dialcohol compound is preferably 0.1 to 10,000 P (poise; 0.01 to 1,000 Pa·s), more preferably 1 to 100 P (poise; 0.1 to 10 Pa·s). When the viscosity of the dialcohol compound is in the above range, the dialcohol compound can be stably and quantitatively fed to the interconnecting and molecular-weight increasing reactor, enabling a reaction of the dialcohol compound with the aromatic polycarbonate prepolymer to proceed uniformly and rapidly. Further, a catalyst solution (aqueous solution and/or organic solution) is introduced through catalyst solution introducing lines (2Cata, 2Catb). The catalyst is stirred by stirring blades (2Ya, 2Yb) and mixed or dispersed, and water and/or an organic solvent is removed from the catalyst composition through dehydration or devolatilization lines (2Fa, 2Fb). The catalyst composition in a molten state is preferably subjected to dehydration treatment or devolatilization treatment. For achieving dehydration to an extent such that the interconnecting and molecular-weight increasing reaction is not adversely affected, the dehydration treatment or devolatilization treatment is conducted under a reduced pressure at, for example, 300 torr (40 kPa) or less, preferably 100 torr (13.3 kPa) or less, more preferably 0.01 torr (1.3 Pa) to 100 torr (13.3 kPa). A preferred temperature set for the dehydration treatment varies depending on the type of the dialcohol compound since the dialcohol compounds of different types have different melt viscosities, but the dehydration treatment is conducted in the temperature range of the melting point of the dialcohol compound or higher, preferably the melting point of the dialcohol compound to a temperature higher than the melting point by 80° C., more preferably the melting point of the dialcohol compound to a temperature higher than the melting point by 50° C. The yardstick of the dehydration treatment is not particularly limited, and the catalyst composition obtained after the dehydration treatment preferably has a water content of 3% by mass or less, more preferably 1% by mass or less, further preferably 0.3% by mass or less, especially preferably 0.03% by mass or less. This operation makes it possible to more quantitatively stably feed the catalyst composition.

For example, when 2-butyl-2-ethyl-1,3-propane glycol (BEPG) is used as the dialcohol compound which is an interconnecting agent, BEPG, the melting point of which is about 43° C., is melted at, for example, 75 to 80° C., and a predetermined amount of an aqueous catalyst solution is added to BEPG and then, the resultant composition is subjected to dehydration under conditions at 1 torr for about 30 minutes as a yardstick while stirring.

The interconnecting agent preparation apparatuses (2Ra, 2Rb) are vessels capable of heating to 50 to 200° C., and the stirring blades (2Ya, 2Yb) fitted to the interconnecting agent preparation apparatuses (2Ra, 2Rb) can be a general stirring blade, such as an anchor blade, a paddle blade, a turbine blade, an anchor-type stirring blade, a Maxblend® type stirring blade, a helical ribbon-type stirring blade, or a lattice blade, and the form of the stirring blade is not particularly limited as long as it is capable of stirring.

In the continuous production process, it is preferred that two interconnecting agent preparation apparatuses are used in the interconnecting agent preparation step as shown in FIG. 1. By using two interconnecting agent preparation apparatuses, mixing and melting can be alternately performed and switching valve 2Bp enables the catalyst composition to be continuously fed to mixer 6Mix through interconnecting agent constant-delivery feed pump 2P.

The prepolymer mixture discharged from mixer 6Mix is successively continuously fed to fifth horizontal stirring reactor 7R, and, in fifth horizontal stirring reactor 7R, an interconnecting and molecular-weight increasing reaction proceeds under temperature and pressure conditions suitable for conducting the interconnecting and molecular-weight increasing reaction. By-produced phenol and part of the unreacted monomers are removed from the reaction system through vent conduit 7F.

For preventing the catalyst composition from solidifying, in the feed line (feed pipe) for the catalyst composition and devices, such as a valve and a pump, there can be used a double pipe in which the catalyst composition flows on the inner side and a heating medium flows on the outer side, and devices, such as a valve and a pump of a jacket type, further preferably of a full-jacket type.

In step C, the residence time of the reaction mixture in the interconnecting and molecular-weight increasing reactor (a period of time required until the obtained high molecular-weight polycarbonate resin is withdrawn after feeding the prepolymer mixture) tends to depend on the reaction apparatus (reactor) used and hence cannot be generally defined, but is preferably 60 minutes or less, more preferably 1 to 60 minutes, further preferably 5 to 60 minutes, further preferably 20 to 60 minutes, further preferably 25 to 60 minutes, especially preferably 30 to 60 minutes.

In the process according to the present embodiment, by preliminarily mixing the aromatic polycarbonate prepolymer and catalyst composition in a mixer and then continuously feeding the resultant mixture to an interconnecting and molecular-weight increasing reactor to cause an interconnecting and molecular-weight increasing reaction, the catalyst composition can be fed stably and accurately, and the amount of spontaneously generated heterologous structures inherent of a melt polymerization method can be further suppressed. As a result, a high molecular-weight polycarbonate resin having high quality such that the N value is low and the color tone is excellent and the increase of heterologous structures is markedly suppressed can be produced by a melt polymerization method.

The reaction conditions in step C are set so that high interface renewing performance can be secured at a high temperature in a high degree of vacuum by appropriately selecting a polymerization apparatus and a stirring blade.

The reaction temperature in the interconnecting and molecular-weight increasing reactor in step C is, for example, in the range of from 240 to 320° C., preferably 260 to 310° C., more preferably 280 to 310° C., and the reaction pressure is 10 torr or less (1,333 Pa or less), preferably 2.0 torr or less (267 Pa or less), more preferably 0.01 to 1.5 torr (1.3 to 200 Pa), further preferably 0.01 to 1.0 torr (1.3 to 133 Pa). Therefore, as sealing for the stirring shaft, a sealing mechanism including a mechanical seal is preferably employed.

In step C, it is desired that the liquid level is controlled so that the average residence time of the reaction mixture in the interconnecting and molecular-weight increasing reaction preferably becomes 60 minutes or less, more preferably 1 to 60 minutes, further preferably 5 to 60 minutes, further preferably 20 to 60 minutes, further preferably 25 to 60 minutes, especially preferably 30 to 60 minutes. Further, in the reactor, by-produced phenol is discharged through the distillate pipe.

In the production apparatus shown in FIG. 1, by-products, such as phenol, are continuously recovered in a liquid state from condensers 3C, 4C fitted respectively to first vertical stirring reactor 3R and second vertical stirring reactor 4R. Condensers 3C, 4C individually preferably have two or more separate condensers because part of or all of the distillate condensed in the condenser closest to the reactor can be refluxed to first vertical stirring reactor 3R and second vertical stirring reactor 4R, facilitating the control of the molar ratio for the raw materials. Further, cold traps (not shown) are provided downstream of condensers 5C, 6C, 7C fitted respectively to third vertical stirring reactor 5R, fourth vertical stirring reactor 6R, and fifth horizontal stirring reactor 7R to continuously recover by-products in a solid state.

The recovered by-products subsequently undergo steps of, e.g., hydrolysis and purification, and then can be recycled. Examples of main by-products include aromatic monohydroxy compounds, such as phenol, the unreacted dialcohol compound, and a cyclic carbonate derived from the dialcohol compound. Particularly, phenol is recovered and then can be recycled by feeding it to a diphenyl carbonate production step. When a cyclic carbonate derived from the dialcohol compound is by-produced, the cyclic carbonate can be similarly recovered and recycled.

Thus, in the continuous production apparatus shown in FIG. 1, after the inner temperatures and pressures of the five reactors have reached their respective predetermined values, the molten raw material mixture and the catalyst are continuously fed through the preheaters to initiate a melt polycondensation based on a transesterification reaction. Therefore, immediately after the start of melt polycondensation, the average residence time of the polymerization reaction mixture in each reactor becomes equivalent to that at the time of the steady operation. Further, low molecular-weight prepolymers are interconnected using the dialcohol compound having a high transesterification reaction rate so that the molecular weight of the prepolymer is increased in a short time, and therefore the prepolymer does not experience unnecessary heat history and hence is unlikely to suffer branching. Further, the resultant resin has excellent color tone.

EXAMPLES

Hereinbelow, the present invention will be described in more detail with reference to the following Examples, which should not be construed as limiting the scope of the present invention.

The physical property values in the following Examples were measured by the methods described below.

(1) Weight Average Molecular Weight:

The weight average molecular weight is a polystyrene-converted weight average molecular weight, as measured by gel permeation chromatography (GPC), which is determined from a calibration curve preliminarily prepared using standard polystyrenes.

A calibration curve was first drawn using polystyrenes of known molecular weight (molecular weight distribution=1) as standards ("PStQuick MP-M", manufactured by TOSOH CORPORATION). The standard polystyrenes were analyzed, and the elution time of each peak and the molecular weight were plotted. By an approximation of a cubic equation, a calibration curve was obtained. The weight average molecular weight (Mw) was calculated using the following equation.

$$Mw = \Sigma(W_i \times M_i) \div \Sigma(W_i)$$

Here, i indicates an i-th dividing point of the divisions of the molecular weights M, $W_i$ is the weight of an i-th fraction, and $M_i$ is the molecular weight of an i-th fraction. The molecular weight M is a value of the polystyrene molecular weight at the same elution time in the calibration curve.

[Measurement Conditions]

Apparatus: HLC-8320GPC, manufactured by TOSOH CORPORATION

Columns: Guard column TSKguardcolumn SuperMPHZ-M×1

Analysis columns: TSKgel SuperMultiporeHZ-M×3

Solvent: HPLC grade chloroform

Amount of injection: 10 μL

Sample concentration: 0.2 w/v % HPLC grade chloroform solution

Solvent flow rate: 0.35 ml/min

Measurement temperature: 40° C.

Detector: RI (2) Terminal Phenyl Group Amount and Terminal Phenyl Group Concentration:

0.05 g of a resin sample was dissolved in 1 ml of deuterated chloroform (containing 0.05 w/v % TMS), and analyzed at 23° C. using a nuclear magnetic resonance analyzer under the conditions shown below to measure a $^1$H-NMR spectrum, and the amount of terminal phenyl groups in the prepolymer (PP) was calculated.

[Measurement Conditions]

Apparatus: LA-500 (500 MHz), manufactured by JEOL Ltd.

Observed nucleus: $^1$H

Relaxation delay: 1 s x_angle: 45 deg x_90_width: 20 μs x_plus: 10 μs

Scan: 500 times

51

[Calculation Method]

The amount of terminal phenyl groups in the PP and the terminal phenyl group concentration were calculated from the integral ratio of the peak of terminal phenyl groups at near 7.4 ppm to the peak of phenylene group (derived from a BPA skeleton) at near 7.0 to 7.3 ppm.

(3) Terminal Hydroxy Group Concentration:

0.05 g of a resin sample was dissolved in 1 ml of deuterated chloroform (containing 0.05 w/v % TMS), and analyzed at 23° C. using a nuclear magnetic resonance analyzer under the same conditions as mentioned above to measure a $^1$H-NMR, and the terminal hydroxy group concentration (OH concentration) of each of the prepolymer (PP) and polycarbonate (PC) having an increased molecular weight was calculated.

[Calculation]

The terminal hydroxy group concentration (OH concentration) of each of the PP and PC having an increased molecular weight was calculated from the integral ratio of the hydroxy group peak at 4.7 ppm to the peaks of phenyl and phenylene groups (terminal phenyl groups and BPA skeleton-derived phenylene groups) at near 7.0 to 7.5 ppm.

(4) N Value:

An N value was calculated by the following Equation.

$$N \text{ value} = (\log(Q160) - \log(Q10))/(\log 160 - \log 10) \quad (1)$$

Q160 is the melt flow volume per unit time (ml/sec) at 280° C. and 160 kg load, and was measured with CFT-500D, manufactured by Shimadzu Corporation, and calculated with respect to strokes of 7.0 to 10.0 mm. The nozzle diameter was 1 mm, and the nozzle length was 10 mm.

Q10 is the melt flow volume per unit time (ml/sec) at 280° C. and 10 kg load, and was measured with CFT-500D, manufactured by Shimadzu Corporation, and calculated with respect to strokes of 7.0 to 10.0 mm. The nozzle diameter was 1 mm, and the nozzle length was 10 mm.

(5) YI Value (Yellowness Index):

An YI value is the degree as to how far the hue is from colorless or white in the yellow direction. 6 g of a resin sample was dissolved in 60 ml of methylene chloride, and the resultant sample in a liquid state was subjected to measurement in accordance with the JIS K7105 standards using a spectrophotometer (SE2000, manufactured by Nippon Denshoku Industries Co., Ltd.).

(6) Heterologous Structure Amount:

0.05 g of a resin sample was dissolved in 1 ml of deuterated chloroform (containing 0.05 w/v % TMS), and analyzed at 23° C. using a nuclear magnetic resonance analyzer under the same conditions as mentioned above to measure a $^1$H-NMR, and the amount of heterologous structures in polycarbonate (PC) having an increased molecular weight was determined. Specifically, according to the $^1$H-NMR identification described at P. 7,659 of the document of Polymer 42 (2001) 7653-7661, from the ratio of Ha and Hb present, the amount of the heterologous structures (PSA) shown below was determined.

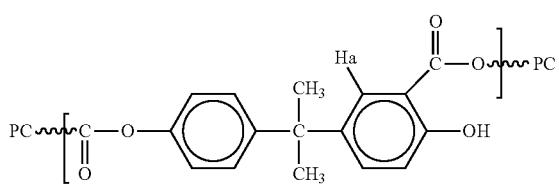

52

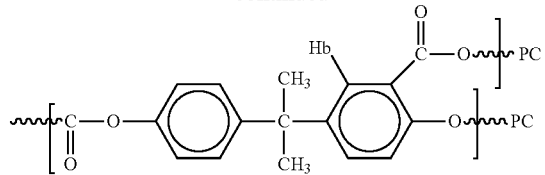

[Calculation]

The amount of heterologous structures was calculated from the integral ratio of the signals of Ha (near 8.01 ppm) and Hb (near 8.15 ppm) in the above heterologous structure units to the signals of phenyl and phenylene groups (terminal phenyl groups and BPA skeleton-derived phenylene groups) at near 7.0 to 7.5 ppm.

Example 1

Using a continuous production apparatus shown in FIG. 1 having two main raw material preparation tanks (1Ra, 1Rb), two interconnecting agent preparation tanks (2Ra, 2Rb), four vertical stirring reactors (3R to 6R), and a horizontal stirring reactor (7R), a polycarbonate resin was produced under the conditions shown below.

First, in the individual reactors and preheaters, the inner temperatures and pressures shown below were preliminarily set according to the reaction conditions.

(Preheater 1H) 225° C.
(First vertical stirring reactor 3R)
Inner temperature: 215° C.; pressure: 200 torr (26.6 kPa);
  Temperature of the heating medium: 245° C.
(Preheater 3H) 235° C.
(Second vertical stirring reactor 4R)
Inner temperature: 225° C.; pressure: 150 torr (20 kPa);
  Temperature of the heating medium: 255° C.
(Preheater 4H) 245° C.
(Third vertical stirring reactor 5R)
Inner temperature: 235° C.; pressure: 100 torr (13.3 kPa);
  Temperature of the heating medium: 265° C.
(Preheater 5H) 270° C.
(Fourth vertical stirring reactor 6R)
Inner temperature: 260° C.; pressure: 0.1 torr (13.3 Pa);
  Temperature of the heating medium: 280° C.

A molten mixture, which was separately prepared by mixing diphenyl carbonate and BPA in main raw material preparation tanks 1Ra and 1Rb in an atmosphere of nitrogen gas so that the raw material molar ratio {diphenyl carbonate/bisphenol A (BPA)} became 1.125, was continuously fed to first vertical stirring polymerizer 3R at a flow rate of 24.05 kg/hr, and the liquid level was kept constant while controlling the opening degree of a valve provided in a polymer discharge line at the bottom of the polymerizer so that the average residence time in first vertical stirring polymerizer 3R became 60 minutes. In this instance, as a second catalyst, a 0.005 mol/L aqueous solution of cesium carbonate ($Cs_2CO_3$) in an amount of $0.25 \times 10^{-6}$ mol relative to 1 mol of BPA (2.6 ml/hr) was added from 1Cat.

The polymerization reaction mixture discharged from the bottom of first vertical stirring reactor 3R was, subsequently, continuously fed to second vertical stirring reactor 4R, third vertical stirring reactor 5R, fourth vertical stirring reactor 6R, and mixer 6Mix.

Simultaneously, in the interconnecting agent preparation tanks having anchor blades, 5,000 g of a dialcohol compound (2-butyl-2-ethyl-1,3-propane glycol; BEPG) was heat-melted at 75 to 80° C., and 102 ml of a 0.005 mol/L aqueous solution of cesium carbonate ($Cs_2CO_3$) was added as a first catalyst to the dialcohol compound, and the resultant mixture was subjected to dehydration treatment (final water content: 0.03% by mass) at 0.1 torr to prepare a catalyst composition.

Simultaneously with feeding a prepolymer (PP) at a flow rate of 13,200 g/hr to mixer 6Mix, the above-prepared dialcohol compound having a melt viscosity of 40 P (poise) and containing a catalyst was continuously fed to mixer 6Mix from interconnecting agent preparation tanks (2Ra, 2Rb) using a constant delivery pump at a flow rate of 125 g/hr {0.25 mol relative to 1 mol of the total of terminal groups of PP (end-capped terminal phenyl group amount)}. In this instance, the amount of the first catalyst added was $0.25 \times 10^{-6}$ mol relative to 1 mol of BPA constituting the prepolymer. The temperature in preheater 6H was 290° C., the temperature in mixer 6Mix was 280° C., the pressure in mixer 6Mix was 760 torr (0.10 MPa), and the temperature of the heating medium was 290° C.

The PP continuously fed to mixer 6Mix had a polystyrene-converted weight average molecular weight (Mw) of 31,000, a terminal phenyl group concentration of 5.9 mol %, and a terminal hydroxy group concentration of 230 ppm.

A period of time until the PP was subjected to interconnecting and molecular-weight increasing (transesterification) reaction under reduced pressure conditions after the catalyst composition was added to the PP was 3 minutes.

The PP mixture was fed from mixer 6Mix to fifth horizontal stirring reactor 7R at a flow rate of 13,325 g/hr. With respect to the pressure in fifth horizontal stirring reactor 7R in this instance, reduced pressure conditions at 0.5 torr (66.7 Pa) were set, and the degree of vacuum was the pressure as set and a stable operation was able to be made without fluctuations. The temperature of the heating medium was set to 320° C., and the inner temperature (reaction temperature) was set to 310° C.

During the polymerization reaction (molecular weight increasing reaction), the liquid level was controlled so that the average residence time in each vertical reactor became 60 minutes and the average residence time in fifth horizontal stirring reactor 7R became 60 minutes, and phenol by-produced simultaneously with the polymerization reaction was distilled off. Stirring blade 7Y of fifth horizontal stirring reactor 7R was stirred at 20 rpm.

The prepolymer mixture obtained after being mixed in mixer 6Mix had a terminal hydroxy group concentration of 200 ppm and a polystyrene-converted weight average molecular weight (Mw) of 27,000.

The polycarbonate resin obtained after the interconnecting and molecular-weight increasing reaction conducted in fifth horizontal stirring reactor 7R at a reaction temperature of 310° C. under a pressure of 0.5 torr had a polystyrene-converted weight average molecular weight (Mw) of 59,000, and, during the time of from the addition of the catalyst composition to the completion of molecular weight increasing reaction in fifth horizontal stirring reactor 7R, an Mw increase per residence time was 533. Further, the obtained polycarbonate resin had an N value of 1.21, a terminal hydroxy group concentration of 330 ppm, a YI value of 1.1, and a heterologous structure (PSA) amount of 700 ppm.

The reactors used in Example 1 are as follows.
First to Fourth Vertical Stirring Reactors
 Manufactured by: Sumitomo Heavy Industries, Ltd.
 Material: SUS 316L electropolished
 Stirring blade:
 First to third vertical stirring reactors: Maxblend® type stirring blade
 Fourth vertical stirring reactor: Double-helical ribbon blade
Mixer (in-Line Mixer)
 S1KRC Reactor, manufactured by Kurimoto, Ltd.
 Size: L/D=10.2; Body effective volume=0.12 L Feed Pump for the Catalyst Composition
 Continuous non-pulsation metering pump, manufactured by Fuji Techno Industries Corporation
Feed Pipe
 Double pipe heat insulation (mechanical seal)
Fifth Horizontal Stirring Reactor
 Manufactured by: Hitachi, Ltd.
 Type of apparatus: Spectacle-shaped blade polymerizer; effective volume=13 L
 Material: SUS 316L electropolished
 Withdrawal apparatus: Screw-type extractor
 Method for adjusting the oxygen concentration in the reactor: Pressure devolatilization by purging with nitrogen The residence time of the reaction mixture is an average residence time of the reaction mixture residing in the horizontal stirring reactor from the feed inlet for the aromatic polycarbonate prepolymer to the outlet for the produced high molecular-weight polycarbonate resin.

In Example 1, before starting the continuous production, the fifth horizontal stirring reactor was preliminarily filled with 13,200 g of the prepolymer (PP) mixture, and then the liquid level was kept constant, and gear pump 6P and screw-type extractor 7P were set to a flow rate of 13,200 g/hr so as to achieve conditions such that the PP mixture resided in the reactor for 60 minutes, and the residence time was actually measured and confirmed by a tracer.

Example 2

Using the same apparatus as used in Example 1, a polycarbonate was produced under the conditions shown below. First, in the individual reactors and preheaters, the inner temperatures and pressures were preliminarily set according to the same reaction conditions as those employed in Example 1.

A molten mixture, which was separately prepared by mixing diphenyl carbonate and BPA in main raw material preparation tanks 1Ra and 1Rb in an atmosphere of nitrogen gas so that the raw material molar ratio {diphenyl carbonate/bisphenol A (BPA)} became 1.110, was continuously fed to first vertical stirring polymerizer 3R at a flow rate of 24.07 kg/hr, and the liquid level was kept constant while controlling the opening degree of a valve provided in a polymer discharge line at the bottom of the polymerizer so that the average residence time in first vertical stirring polymerizer 3R became 60 minutes. In this instance, as a second catalyst, a 0.005 mol/L aqueous solution of cesium carbonate ($Cs_2CO_3$) in an amount of $0.17 \times 10^{-6}$ mol relative to 1. mol of BPA and, as a cocatalyst, a 0.59 mol/L aqueous solution of tetramethylammonium hydroxide ($Me_4NOH$) in an amount of $20 \times 10^{-6}$ mol relative to 1 mol of BPA (1.7 ml/hr) were added from 1Cat.

The polymerization reaction mixture discharged from the bottom of first vertical stirring reactor 3R was, subsequently, continuously fed to second vertical stirring reactor 4R, third vertical stirring reactor 5R, fourth vertical stirring reactor 6R, and mixer 6Mix.

Simultaneously, in the interconnecting agent preparation tanks having anchor blades, 5,320 g of a dialcohol compound (2-butyl-2-ethyl-1,3-propane glycol; BEPG) was heat-melted at 75 to 80° C., and 136 ml of a 0.005 mol/L aqueous solution of cesium carbonate ($Cs_2CO_3$) was added as a first catalyst to the dialcohol compound, and the resultant mixture was subjected to dehydration treatment (final water content: 0.03% by mass) at 0.1 torr to prepare a catalyst composition.

Simultaneously with feeding a prepolymer (PP) at a flow rate of 13,280 g/hr to mixer 6Mix, the above-prepared dialcohol compound having a melt viscosity of 40 poises and containing a catalyst was continuously fed to mixer 6Mix from interconnecting agent preparation tanks (2Ra, 2Rb) using a constant delivery pump at a flow rate of 133 g/hr {0.25 mol relative to 1 mol of the total of terminal groups of PP (end-capped terminal phenyl group amount)}. In this instance, the amount of the first catalyst added was $0.25 \times 10^{-6}$ mol relative to 1 mol of BPA constituting the prepolymer.

The PP continuously fed to mixer 6Mix had a polystyrene-converted weight average molecular weight (Mw) of 25,000, a terminal phenyl group concentration of 6.3 mol %, and a terminal hydroxy group concentration of 150 ppm.

A period of time until the PP was subjected to interconnecting and molecular-weight increasing (transesterification) reaction under reduced pressure conditions after the catalyst composition was added to the PP was 3 minutes.

The PP mixture was fed from mixer 6Mix to fifth horizontal stirring reactor 7R at a flow rate of 13,413 g/hr. With respect to the pressure in fifth horizontal stirring reactor 7R in this instance, reduced pressure conditions at 0.5 torr were set, and the degree of vacuum was the pressure as set and a stable operation was able to be made without fluctuations. The temperature of the heating medium was set to 310° C., and the inner temperature (reaction temperature) was set to 300° C.

During the polymerization reaction (molecular weight increasing reaction), the liquid level was controlled so that the average residence time in each vertical reactor became 60 minutes and the average residence time in fifth horizontal stirring reactor 7R became 60 minutes, and phenol by-produced simultaneously with the polymerization reaction was distilled off. Stirring blade 7Y of fifth horizontal stirring reactor 7R was stirred at 20 rpm.

The prepolymer mixture obtained after being mixed in mixer 6Mix had a terminal hydroxy group concentration of 250 ppm and a polystyrene-converted weight average molecular weight (Mw) of 23,000.

The polycarbonate resin obtained after the interconnecting and molecular-weight increasing reaction conducted in fifth horizontal stirring reactor 7R at a reaction temperature of 300° C. under a pressure of 0.5 torr had a polystyrene-converted weight average molecular weight (Mw) of 57,000, and, during the time of from the addition of the catalyst composition to the completion of molecular weight increasing reaction in fifth horizontal stirring reactor 7R, an Mw increase per residence time of 1 minute was 567. Further, the obtained polycarbonate resin had an N value of 1.21, a terminal hydroxy group concentration of 430 ppm, a YI value of 1.1, and a heterologous structure (PSA) amount of 300 ppm.

The reactors used in Example 2 are the same as the reactors used in Example 1.

In Example 2, before starting the continuous production, the above-mentioned fifth horizontal stirring reactor was preliminarily filled with 13,280 g of the prepolymer (PP) mixture, and then the liquid level was kept constant, and gear pump 6P and screw-type extractor 7P were set to a flow rate of 13,280 g/hr so as to achieve conditions such that the PP mixture resided in the reactor for 60 minutes, and the residence time was actually measured and confirmed by a tracer.

As apparent from Table 1, when the process according to the present embodiment is employed, the catalyst composition can be stably fed, so that a stable operation of the apparatus can be made. Further, there can be obtained a polycarbonate resin which not only can achieve a desired high molecular weight but also has suppressed a heterologous structure amount and a low N value as well as a low YI value and excellent hue.

Comparative Example 1

Substantially the same procedure as in Example 1 was repeated except that cesium carbonate ($Cs_2CO_3$) in an amount of $0.5 \times 10^{-6}$ mol/BPA was added as a catalyst in the fourth step (step A), and that no catalyst was added to the dialcohol compound. As a result, a polycarbonate resin having a large heterologous structure amount was obtained.

Comparative Example 2

On the other hand, substantially the same procedure as in Example 1 was repeated except that no catalyst was added to the dialcohol compound, and that no dehydration treatment was performed. As a result, the degree of vacuum in the third step was unstable, so that a stable operation was difficult.

TABLE 1

| | | Unit | Example 1 | Example 2 | Comparative Example 1 | Comparative Example 2 |
|---|---|---|---|---|---|---|
| Fourth step | Type and amount of second catalyst added | μmol/BPA | 0.25 μmol-$Cs_2CO_3$/BPA | 0.17 μmol-$Cs_2CO_3$/BPA + 20 μmol-$Me_4NOH$/BPA | 0.5 μmol-$Cs_2CO_3$/BPA | 0.5 μmol-$Cs_2CO_3$/BPA |
| | Molecular weight (Mw) of prepolymer | — | 31000 | 25000 | 31000 | 31000 |
| | Terminal hydroxy group concentration of prepolymer | ppm | 230 | 250 | 230 | 230 |
| | Terminal phenyl group concentration of prepolymer | mol %/BPA unit | 5.9 | 6.3 | 5.9 | 5.9 |
| First step | Type of dialcohol compound | — | BEPG | BEPG | BEPG | BEPG |
| | Amount of dialcohol compound | g | 5000 | 5320 | 5000 | 5000 |
| | Type of first catalyst | — | $Cs_2CO_3$ | $Cs_2CO_3$ | — | — |
| | Concentration of aqueous solution of first catalyst | mol/L | 0.005 | 0.005 | — | — |
| | Amount of aqueous catalyst solution added to dialcohol compound | ml | 102 | 136 | — | — |

TABLE 1-continued

| | | Unit | Example 1 | Example 2 | Comparative Example 1 | Comparative Example 2 |
|---|---|---|---|---|---|---|
| | Dehydration treatment for catalyst composition | — | Done | Done | Done | None |
| Second step | Feed rate of prepolymer | g/hr | 13200 | 13280 | 13200 | 13200 |
| | Feed rate of catalyst composition or dialcohol compound | mol (*1) g/hr | 0.25 125 | 0.25 133 | 0.25 125 | 0.25 125 |
| | Type and amount of first catalyst added | μmol/BPA | 0.25 μmol-$Cs_2CO_3$/BPA | 0.33 μmol-$Cs_2CO_3$/BPA | No catalyst added | No catalyst added |
| Third step | Feed rate of prepolymer mixture (g./hr) | g/hr | 13325 | 13413 | 13325 | Stable operation was difficult |
| | Amount of resin in reactor | g | 13325 | 13413 | 13325 | |
| | Reaction temperature | ° C. | 310 | 300 | 310 | |
| | Reaction pressure | torr (Pa) | 0.5(67) | 0.5(67) | 0.5(67) | |
| | Average residence time in polymerizer | minute | 60 | 60 | 60 | |
| | Number of revolutions for polymerizer | rpm | 20 | 20 | 20 | |
| High molecular-weight aromatic polycarbonate resin | Mw | — | 59000 | 57000 | 57000 | |
| | OH Concentration | ppm | 330 | 430 | 500 | |
| | N Value | — | 1.21 | 1.21 | 1.23 | |
| | YI Value | — | 1.1 | 1.1 | 1.3 | |
| | Heterologous structure (PSA) amount | ppm | 700 | 300 | 1100 | |

(*1) mol relative to 1 mol of the total of terminal groups of PP

Industrial Applicability

In the process of the present invention for producing a high molecular-weight aromatic polycarbonate resin, which includes the step of subjecting an aromatic polycarbonate prepolymer and a dialcohol compound to interconnecting and molecular-weight increasing reaction, by feeding a catalyst for catalyzing the molecular weight increasing reaction in the form of a catalyst composition obtained by mixing the catalyst with the dialcohol compound, the generation of heterologous structures can be effectively suppressed, so that a high molecular-weight polycarbonate resin having excellent quality such that the N value is low and the hue is excellent can be economically advantageously produced.

The invention claimed is:

1. A process for producing a high molecular-weight aromatic polycarbonate resin, the process comprising:
   providing an aromatic polycarbonate prepolymer;
   mixing a dialcohol compound represented by the following Formula (1) with a first catalyst to obtain a catalyst composition;
   mixing the obtained catalyst composition with the aromatic polycarbonate prepolymer to obtain a prepolymer mixture; and
   obtaining a high molecular-weight aromatic polycarbonate by subjecting the obtained prepolymer mixture to heating treatment under reduced pressure conditions:

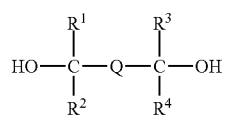

(1)

wherein, in Formula (1), $R^1$ to $R^4$ each independently represent a hydrogen atom, a halogen atom, or a linear or branched alkyl group having 1 to 5 carbon atoms; and Q represents a divalent group comprising at least one member selected from the group consisting of an aliphatic hydrocarbon group, an aromatic hydrocarbon group, an oxygen atom, a sulfur atom, a sulfonic group, a sulfoxide group, a carbonyl group, a dialkylsilyl group, and a diarylsilyl group and optionally having a substituent, or a single bond, wherein the high molecular-weight aromatic polycarbonate resin obtained has a content of heterologous structure of less than 1100 ppm.

2. The process according to claim 1, wherein the catalyst composition has been subjected to dehydration treatment or devolatilization treatment.

3. The process according to claim 1, wherein the first catalyst is at least one member selected from the group consisting of alkali metal salts and alkaline earth metal salts.

4. The process according to claim 1, wherein providing an aromatic polycarbobnate prepolymer includes subjecting an aromatic dihydroxy compound and a carbonate diester compound to polycondensation reaction in the presence of a second catalyst to obtain the aromatic polycarbonate prepolymer.

5. The process according to claim 4, wherein the molar ratio of the first catalyst and the second catalyst is from 1:9 to 9:1.

6. The process according to claim 4, wherein the total amount of the the first catalyst and the second catalyst is $1 \times 10^{-6}$ mol or less per 1 mol of the aromatic dihydroxy compound.

7. The process according to claim 4, wherein obtaining the aromatic polycarbonate prepolymer is conducted in coexistence with a cocatalyst.

8. The process according to claim 1, wherein the dialcohol compound is represented by the following Formula (1a):

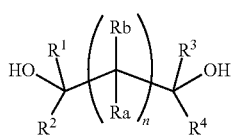
(1a)

wherein, in Formula (1a), Ra and Rb each independently represent a hydrogen atom, a halogen atom, a linear or branched alkyl group having 1 to 30 carbon atoms and optionally including an oxygen atom or a halogen atom, a cycloalkyl group having 3 to 30 carbon atoms and optionally including an oxygen atom or a halogen atom, an aryl group having 6 to 30 carbon atoms and optionally including an oxygen atom or a halogen atom, or an alkoxy group having 1 to 15 carbon atoms and optionally including an oxygen atom or a halogen atom, and Ra and Rb are optionally bonded to each other to form a ring; $R^1$ to $R^4$ each independently represent a hydrogen atom, a halogen atom, or a linear or branched alkyl group having 1 to 5 carbon atoms; and n represents an integer of 0 to 30.

9. The process according to claim 1, wherein the dialcohol compound is represented by the following Formula (1b):

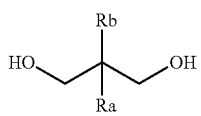
(1b)

wherein, in Formula (1b), Ra and Rb each independently represent a hydrogen atom, a halogen atom, a linear or branched alkyl group having 1 to 30 carbon atoms and optionally icluding an oxygen atom or a halogen atom, a cycloalkyl group having 3 to 30 carbon atoms and optionally including an oxygen atom or a halogen atom, an aryl group having 6 to 30 carbon atoms and optionally including an oxygen atom or a halogen atom, or an alkoxy group having 1 to 15 carbon atoms and optionally including an oxygen atom or a halogen atom, and Ra and Rb are optionally bonded to each other to form a ring.

10. The process according to claim 9, wherein the dialcohol compound is selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol, and 2-methyl-2-propylpropane-1,3-diol.

11. The process according to claim 1, further comprising removing at least part of a cyclic carbonate formed in obtaining the high molecular-weight aromatic polycarbonate to the outside of the reaction system.

12. The process according to claim 11, wherein removing the cyclic carbonate is removing a distillate containing at least part of the cyclic carbonate formed in increasing molecular weight to the outside of the reaction system.

13. The process according to claim 11, wherein the cyclic carbonate is a compound represented by the following Formula (2a):

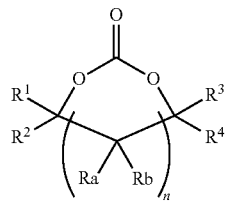
(2a)

wherein, in Formula (2a), Ra and Rb each independently represent a hydrogen atom, a halogen atom, a linear or branched alkyl group having 1 to 30 carbon atoms and optionally including an oxygen atom or a halogen atom, a cycloalkyl group having 3 to 30 carbon atoms and optionally including an oxygen atom or a halogen atom, an aryl group having 6 to 30 carbon atoms and optionally including an oxygen atom or a halogen atom, or an alkoxy group having 1 to 15 carbon atoms and optionally including an oxygen atom or a halogen atom, and Ra and Rb are optionally bonded to each other to form a ring; $R^1$ to $R^4$ each independently represent a hydrogen atom, a halogen atom, or a linear or branched alkyl group having 1 to 5 carbon atoms; and n represents an integer of 0 to 30.

14. The process according to claim 11, wherein the cyclic carbonate is a compound represented by the following Formula (2b):

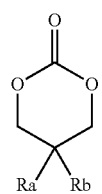
(2b)

wherein, in Formula (2b), Ra and Rb each independently represent a hydrogen atom, a linear or branched alkyl group having 1 to 30 carbon atoms and optionally including an oxygen atom or a halogen atom, a cycloalkyl group having 3 to 30 carbon atoms and optionally including an oxygen atom or a halogen atom, an aryl group having 6 to 30 carbon atoms and optionally including an oxygen atom or a halogen atom, or an alkoxy group having 1 to 15 carbon atoms and optionally including an oxygen atom or a halogen atom, and Ra and Rb are optionally bonded to each other to form a ring.

15. The process according to claim 9, wherein the dialcohol compound is 2-butyl-2-ethylpropane-1,3-diol.

* * * * *

UNITED STATES PATENT AND TRADEMARK OFFICE
CERTIFICATE OF CORRECTION

Page 1 of 1

PATENT NO. : 9,822,218 B2
APPLICATION NO. : 15/032763
DATED : November 21, 2017
INVENTOR(S) : Isahaya et al.

It is certified that error appears in the above-identified patent and that said Letters Patent is hereby corrected as shown below:

In the Claims

At Column 58, Line 50 (Claim 4), please change "polycarbobnate" to -- polycarbonate --.

At Column 58, Line 59 (Claim 6), please change "the the first" to -- the first --.

At Column 59, Line 37 (Claim 9), please change "icluding" to -- including --.

Signed and Sealed this
Twenty-fourth Day of July, 2018

Andrei Iancu
*Director of the United States Patent and Trademark Office*